US011890829B2

(12) United States Patent
Iwai et al.

(10) Patent No.: US 11,890,829 B2
(45) Date of Patent: Feb. 6, 2024

(54) CARDBOARD BOX DIVIDING DEVICE AND CARDBOARD BOX PRODUCTION DEVICE

(71) Applicant: MITSUBISHI HEAVY INDUSTRIES MACHINERY SYSTEMS, LTD., Hyogo (JP)

(72) Inventors: Takanori Iwai, Hyogo (JP); Naoki Shigeyama, Hyogo (JP); Masakazu Ohira, Hyogo (JP); Yasunari Suzuki, Hyogo (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 0 days.

(21) Appl. No.: 16/771,716

(22) PCT Filed: Dec. 15, 2017

(86) PCT No.: PCT/JP2017/045213
§ 371 (c)(1),
(2) Date: Jun. 11, 2020

(87) PCT Pub. No.: WO2019/116579
PCT Pub. Date: Jun. 20, 2019

(65) Prior Publication Data

US 2020/0398514 A1 Dec. 24, 2020

(51) Int. Cl.
*B26D 7/01* (2006.01)
*B31B 50/20* (2017.01)
(Continued)

(52) U.S. Cl.
CPC .............. *B31B 50/20* (2017.08); *B26D 7/015* (2013.01); *B26D 7/0675* (2013.01); *B26D 2007/322* (2013.01); *B65H 2301/4229* (2013.01)

(58) Field of Classification Search
CPC ........ B26D 7/0675; B26D 7/015; B26D 1/02; B26D 1/08; B31B 50/20
See application file for complete search history.

(56) References Cited

U.S. PATENT DOCUMENTS 3,030,867 A 4/1962 Wright
3,575,076 A * 4/1971 Baldwin ................ B26F 1/382 83/422
(Continued)

FOREIGN PATENT DOCUMENTS

CN 101784468 A 7/2010
CN 103057166 A 4/2013
(Continued)

OTHER PUBLICATIONS

International Search Report and Written Opinion of International Application No. PCT/JP2017/045213 dated Mar. 13, 2018; 11pp.
(Continued)

*Primary Examiner* — Evan H MacFarlane
*Assistant Examiner* — Liang Dong
(74) *Attorney, Agent, or Firm* — HAUPTMAN HAM, LLP

(57) ABSTRACT

A cardboard box dividing device and a cardboard box production device are provided with: lower conveyors on which a plurality of connected cardboard box bodies are stacked and transported; a pressing device pressing the plurality of connected cardboard box bodies stacked on the lower conveyors from above; a cutting knife disposed along a width direction of the connected cardboard box bodies and dividing the plurality of connected cardboard box bodies stacked on the lower conveyors into a front part and a rear part; and a lifting/lowering device lifting and lowering the lower conveyors and the pressing device.

10 Claims, 20 Drawing Sheets

(51) Int. Cl.

| | |
|---|---|
| ***B26D 7/06*** | (2006.01) |
| *B26D 7/32* | (2006.01) |

(56) References Cited

U.S. PATENT DOCUMENTS

| | | | | |
|---|---|---|---|---|
| 4,611,646 | A | | 9/1986 | Wassmer et al. |
| 4,611,656 | A | | 9/1986 | Kendall, Jr. et al. |
| 4,738,078 | A | | 4/1988 | Benz et al. |
| 4,897,985 | A | * | 2/1990 | Buchko ..................... B65B 9/02 53/553 |
| 5,375,492 | A | | 12/1994 | Smitterberg et al. |
| 5,483,856 | A | * | 1/1996 | Smitterberg ............. B26D 1/02 83/23 |
| 5,660,095 | A | | 8/1997 | Smitterberg et al. |
| 8,876,681 | B2 | | 11/2014 | Taketsugu et al. |
| 9,033,646 | B2 | | 5/2015 | Kokubo et al. |
| 2009/0238662 | A1 | | 9/2009 | Duquette |
| 2009/0320697 | A1 | | 12/2009 | Rago |
| 2010/0190626 | A1 | | 7/2010 | Taketsugu et al. |
| 2011/0268550 | A1 | | 11/2011 | Kokubo et al. |
| 2013/0184133 | A1 | | 7/2013 | Sugimoto et al. |
| 2015/0024917 | A1 | * | 1/2015 | Nadachi .................. B31B 50/00 493/53 |
| 2018/0001587 | A1 | | 1/2018 | Yamamuro et al. |

FOREIGN PATENT DOCUMENTS

| | | | |
|---|---|---|---|
| CN | 103269849 | A | 8/2013 |
| CN | 104093556 | A | 10/2014 |
| CN | 107107515 | A | 8/2017 |
| EP | 0641631 | A1 | 3/1995 |
| EP | 0712698 | A2 | 5/1996 |
| JP | H07148697 | A | 6/1995 |
| JP | H08500297 | A | 1/1996 |
| JP | 2003128004 | A | 5/2003 |
| JP | 2008036805 | A | 2/2008 |
| JP | 2011230441 | A | 11/2011 |
| JP | 2013169690 | A | 9/2013 |
| JP | 5645332 | B | 12/2014 |
| JP | 2016132075 | A | 7/2016 |

OTHER PUBLICATIONS

Extended European Search Report for European Application No. 18888264.1 dated Nov. 13, 2020; 7pp.

Office Action for Chinese Application No. 201880079999.X dated Apr. 23, 2021; 16pp.

First Office Action for Chinese Application No. 201780097618.6 dated Apr. 19, 2021; 17pp.

Office Action for U.S. Appl. No. 16/771,686 dated May 14, 2021; 21pp.

International Search Report and Written Opinion of International Application No. PCT/JP2018/046027 dated Mar. 19, 2019; 9pp.

Office Action for Chinese Application No. 2017800976186 dated Apr. 19, 2021; 10pp.

Advisory Action for U.S. Appl. No. 16/771,686 dated Feb. 23, 2022; 6pp.

Office Action for Chinese Application No. 201880079999.X dated Jan. 5, 2022; 12pp.

* cited by examiner

CARDBOARD BOX DIVIDING DEVICE AND CARDBOARD BOX PRODUCTION DEVICE

RELATED APPLICATIONS

The present application is a National Phase of International Application Number PCT/JP2017/045213 filed Dec. 15, 2017.

TECHNICAL FIELD

The present invention relates to a cardboard box dividing device dividing a cardboard box folded into a flat shape after various types of processing on a cardboard sheet into a plurality of pieces and a cardboard box production device to which this cardboard box dividing device is applied.

BACKGROUND ART

A general carton-forming machine produces a flat cardboard box by processing and folding a cardboard sheet and includes a sheet feeding section, a printing section, a slotter creaser section, a die cutting section, a folding section, and a counter-ejector section. The sheet feeding section ejects cardboard sheets stacked on a table one by one and sends the cardboard sheet to the printing section at a constant speed. The printing section, which has a printing unit, performs printing on the cardboard sheet. The slotter creaser section forms a creasing line as a folding line on the printed cardboard sheet and processes a groove forming a flap and a glue tab for bonding. The die cutting section performs punching of a hand hole or the like on the cardboard sheet in which the creasing line, the groove, and the glue tab are formed. The folding section produces the flat cardboard box by applying glue to the glue tab while moving the cardboard sheet in which the creasing line, the groove, the glue tab, and the hand hole or the like are processed, folding the cardboard sheet along the creasing line, and bonding the glue tab. Then, the counter-ejector section stacks the cardboard boxes in which the cardboard sheet is folded and glued, sorts the cardboard boxes into a predetermined number of batches, and discharges the batches.

It is desired to improve cardboard box production efficiency in such carton-forming machines. Accordingly, a technique has been proposed by which a carton-forming machine produces a flat cardboard box in which two cardboard boxes are continuous in a transport direction and a dividing device produces one cardboard box by dividing the two flat cardboard boxes into two pieces. In the case of this technique, the carton-forming machine is capable of continuously producing two cardboard boxes, and thus the time required to produce one cardboard box can be shortened and production efficiency can be improved as compared with the related art. Examples of such cardboard box dividing devices include the cardboard box dividing device that is described in PTL 1.

CITATION LIST

Patent Literature

[PTL 1] U.S. Pat. No. 5,660,095

SUMMARY OF INVENTION

Technical Problem

In the above-described cardboard box dividing device of PTL 1, a flat cardboard box in which two cardboard boxes are continuous in a transport direction is produced first, and then a cardboard box having a predetermined size is produced by the two flat cardboard boxes being divided into two pieces. In this case, a plurality of the flat cardboard boxes, which are long in the transport direction, are stacked and unstable, and thus the upper portions of the plurality of stacked cardboard boxes need to be held when the plurality of stacked cardboard boxes are cut. In PTL 1, a holding device holds the upper portions of the plurality of stacked cardboard boxes, and cutting is performed by a lifting/lowering device lowering the plurality of cardboard boxes with respect to a cutting knife with the upper portions held. Accordingly, it is necessary to synchronously control the pressure at which the holding device holds the cardboard box and the speed at which the cardboard sheet is lowered by the lifting/lowering device, and a problem arises in that it is difficult to control the two devices in synchronization with each other.

The present invention has been made to solve the above-described problem, and an object of the present invention is to provide a cardboard box dividing device and a cardboard box production device with which it is possible to stably cut a cardboard box and achieve structural simplification by independently performing pressing control and lifting/lowering speed control when the cardboard box is cut.

Solution to Problem

A cardboard box dividing device of the present invention for achieving the above object is a cardboard box dividing device for cutting and dividing, along a width direction intersecting with a transport direction, a connected cardboard box laminate in which a plurality of connected cardboard box bodies continuous along the transport direction are stacked in a thickness direction. The cardboard box dividing device includes a lower conveyor on which the plurality of connected cardboard box bodies are stacked and transported, a pressing device pressing, from above, the plurality of connected cardboard box bodies stacked on the lower conveyor, a cutting knife disposed along a width direction of the connected cardboard box body and dividing the plurality of connected cardboard box bodies stacked on the lower conveyor into a front part and a rear part, and a lifting/lowering device lifting and lowering the lower conveyor and the pressing device.

Accordingly, the plurality of stacked connected cardboard box bodies are mounted onto the lower conveyor, are pressed from above by the pressing device at a predetermined cutting position stopped on the lower conveyor, and are cut and divided by the cutting knife by the lifting/lowering device lifting and lowering the plurality of connected cardboard box bodies in that state. Although the connected cardboard box body is unstable in a state where the plurality of connected cardboard box bodies are stacked, the plurality of connected cardboard box bodies on the lower conveyor are cut in a state of being pressed by the pressing device, and thus the plurality of connected cardboard box bodies can be stably cut. At this time, the lower conveyor and the pressing device are integrally lifted and lowered by the lifting/lowering device, and thus lifting/lowering speed control and pressing control on a cardboard box can be separately performed. As a result, it is possible to stably cut the connected cardboard box body and achieve structural simplification by independently performing the lifting/lowering speed control and the pressing control during the cutting of the connected cardboard box body.

In the cardboard box dividing device of the present invention, the lifting/lowering device has a lifting/lowering base supporting the lower conveyor and the pressing device and a lifting/lowering drive device lifting and lowering the lifting/lowering base, and the pressing device has a pressing member supported by the lifting/lowering base so as to be movable along an up-down direction and a pressing drive device moving the pressing member.

Accordingly, the lifting/lowering base is lifted and lowered by the lifting/lowering drive device with the lifting/lowering base supporting the lower conveyor and the pressing device and the pressing drive device supports the pressing member so as to be movable along the up-down direction, and thus it is possible to independently move the lower conveyor and the pressing member up and down with respect to the lifting/lowering base, independently perform the pressing operation of the connected cardboard box body by the pressing member and the lifting/lowering operation of the lower conveyor by the lifting/lowering drive device, and stably cut the plurality of connected cardboard box bodies with a simple configuration.

In the cardboard box dividing device of the present invention, an upper conveyor facing the lower conveyor from above and supporting upper portions of the plurality of stacked connected cardboard box bodies is disposed on the lifting/lowering base so as to be movable along the up-down direction.

Accordingly, the connected cardboard box body is transported in a state of being sandwiched by the lower conveyor and the upper conveyor, and thus the plurality of connected cardboard box bodies can be stably transported, an increase in transport speed can be achieved, and production efficiency can be improved.

In the cardboard box dividing device of the present invention, the upper conveyor is disposed in the pressing member.

Accordingly, the upper conveyor and the pressing member can be made compact since the upper conveyor is disposed in the pressing member.

In the cardboard box dividing device of the present invention, an attachment frame of the pressing device is fixed to the lifting/lowering base, a plurality of the pressing members are fixed to a lower portion of the attachment frame, a space section opening downward is provided between the plurality of pressing members, and the upper conveyor is disposed in the space section so as to be movable along the up-down direction.

Accordingly, the plurality of pressing members are fixed to the lower portion of the attachment frame of the pressing device and the upper conveyor is disposed in the space section provided between the plurality of pressing members, and thus the pressing member and the upper conveyor are disposed side by side in the horizontal direction, no mutual interference arises when the upper conveyor and the pressing member move up and down, and the upper conveyor and the pressing member can be made compact.

In addition, a cardboard box production device of the present invention includes a sheet feeding section supplying a double box sheet, a slotter creaser section performing creasing line processing on a surface of the double box sheet and performing grooving, a folding section forming a connected cardboard box body by folding the double box sheet and bonding end portions, a counter-ejector section discharging a predetermined number of the connected cardboard box bodies at a time after stacking the connected cardboard box bodies while counting the connected cardboard box bodies, and the cardboard box dividing device for cutting and dividing the connected cardboard box body along the width direction intersecting with the transport direction.

Accordingly, the creasing line processing and the grooving are performed on the double box sheet from the sheet feeding section by the slotter creaser section, the connected cardboard box body is formed by the double box sheet being folded by the folding section and the end portions being bonded, the box bodies are stacked while being counted by the counter-ejector section, the connected cardboard box body is cut by the dividing device, and the cardboard boxes are produced as a result. During the cutting by the dividing device, the connected cardboard box body is cut in a state of being pressed by the pressing device, and thus the plurality of connected cardboard box bodies can be stably cut. At this time, the lower conveyor and the pressing device are integrally lifted and lowered by the lifting/lowering device, and thus lifting/lowering speed control and pressing control on a cardboard box can be separately performed. As a result, it is possible to stably cut the cardboard box and achieve structural simplification by independently performing the lifting/lowering speed control and the pressing control during the cutting of the cardboard box.

Advantageous Effects of Invention

According to the cardboard box dividing device and the cardboard box production device of the present invention, it is possible to stably cut the cardboard box and achieve structural simplification by independently performing the lifting/lowering speed control and the pressing control during the cutting of the cardboard box.

DESCRIPTION OF EMBODIMENTS

Hereinafter, a preferred embodiment of a cardboard box dividing device and a cardboard box production device according to the present invention will be described in detail with reference to the accompanying drawings. It should be noted that the present invention is not limited by this embodiment and, in a case where there are a plurality of embodiments, those configured by the embodiments being combined are also included.

Figure 1:
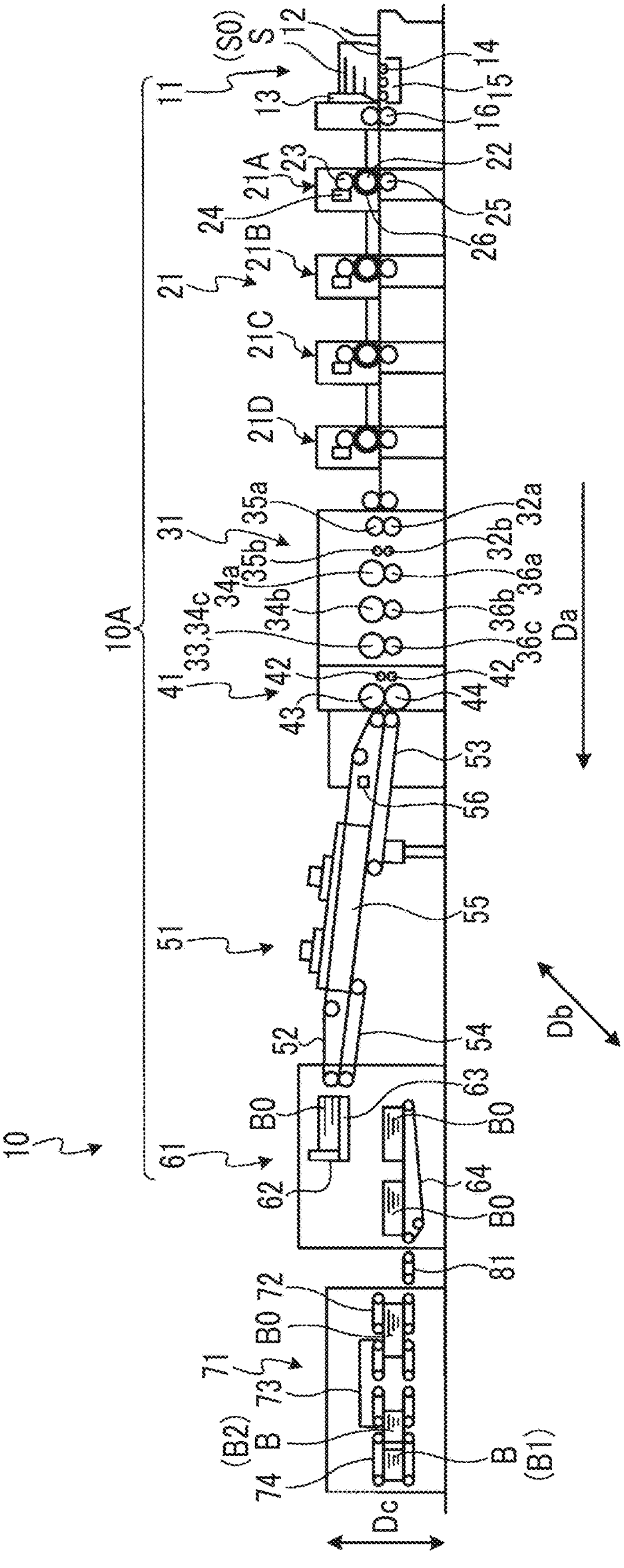
FIG. 1 is a schematic configuration diagram illustrating a cardboard box production device of the present embodiment.

FIG. 1 is a schematic configuration diagram illustrating the cardboard box production device of the present embodiment. In the following description, Da represents the transport direction of a cardboard box, Db represents the width direction of the cardboard box in a transport state (horizontal direction orthogonal to the transport direction Da), and Dc represents the thickness direction of the cardboard box in the transport state (vertical direction orthogonal to the transport direction Da).

As illustrated in FIG. 1, in the present embodiment, a cardboard box production device 10 includes a carton-forming machine 10A and a cardboard box dividing device (hereinafter, referred to as a dividing device) 71. The carton-forming machine 10A includes a sheet feeding section 11, a printing section 21, a slotter creaser section 31, a die cutting section 41, a folding section 51, and a counter-ejector section 61. The sheet feeding section 11, the printing section 21, the slotter creaser section 31, the die cutting section 41, the folding section 51, and the counter-ejector section 61 are disposed so as to form a linear shape along the transport direction Da in which a cardboard sheet S and a cardboard box B are transported, the dividing device 71 is disposed downstream of the counter-ejector section 61 in the transport direction Da, and a transport conveyor 81 is disposed between the counter-ejector section 61 and the dividing device 71.

The carton-forming machine 10A produces the cardboard box B by processing a single box sheet of the cardboard sheet S. The cardboard box production device 10 produces the cardboard box B by processing a double box sheet S0 of the cardboard sheet S. In this case, the carton-forming machine 10A produces a connected cardboard box body B0, in which two cardboard boxes B are connected along the transport direction Da, by processing the double box sheet S0, and the dividing device 71 produces the cardboard box B (B1 and B2) by cutting this connected cardboard box body B0 into two pieces.

First, each device constituting the cardboard box production device 10 of the present embodiment will be described.

The sheet feeding section 11 ejects one cardboard sheet S (single box sheet or double box sheet) at a time and sends the cardboard sheet S to the printing section 21 at a constant speed. This sheet feeding section 11 has a table 12, a front pad 13, a supplying roller 14, a suction device 15, and a feed roll 16. Multiple cardboard sheets S can be stacked and placed on the table 12, and the table 12 is supported so as to be capable of ascending and descending. The front pad 13 is capable of positioning the front end position of the cardboard sheet S stacked on the table 12, and a gap through which one cardboard sheet S is capable of passing is ensured between the lower end portion of the front pad 13 and the table 12. A plurality of the supplying rollers 14 are disposed in the transport direction Da of the cardboard sheet S so as to correspond to the table 12 and, when the table 12 is lowered, the cardboard sheet S that is at the lowest position among the multiple stacked cardboard sheets S can be ejected forward. The suction device 15 suctions the stacked cardboard sheet S downward, that is, to the table 12 or supplying roller 14 side. The feed roll 16 is capable of supplying the cardboard sheet S ejected by the supplying roller 14 to the printing section 21.

The printing section 21 performs multicolor printing (four-color printing in the present embodiment) on the surface of the cardboard sheet S. Four printing units 21A, 21B, 21C, and 21D are disposed in series in the printing section 21, and the printing section 21 is capable of performing printing on the surface of the cardboard sheet S by using four ink colors. Each of the printing units 21A, 21B, 21C, and 21D has substantially the same configuration and has a printing cylinder 22, an ink supply roll (anilox roll) 23, an ink chamber 24, and a receiving roll 25. The printing cylinder 22 has an outer peripheral portion to which a printing plate 26 is attached and is rotatably provided. The ink supply roll 23 is disposed so as to be in contact with the printing plate 26 in the vicinity of the printing cylinder 22 and is rotatably provided. The ink chamber 24, which stores ink, is provided in the vicinity of the ink supply roll 23. The receiving roll 25 transports the cardboard sheet S while imparting a predetermined printing pressure by sandwiching the cardboard sheet S between the printing cylinder 22 and the receiving roll 25 and is rotatably provided so as to face the lower part of the printing cylinder 22. It should be noted that a pair of upper and lower feed rolls (not illustrated) are provided in front of and behind each of the printing units 21A, 21B, 21C, and 21D.

The slotter creaser section 31 performs creasing line processing, cutting, grooving, and glue tab processing on the cardboard sheet S. The slotter creaser section 31 has a first creasing line roll 32*a*, a second creasing line roll 32*b*, a slitter head 33, a first slotter head 34*a*, a second slotter head 34*b*, and a third slotter head 34*c*.

The first creasing line roll 32*a* is formed in a circular shape, and a plurality of the first creasing line rolls 32*a* are disposed at predetermined intervals in the width direction Db of the cardboard sheet S. The second creasing line roll 32*b* is formed in a circular shape, and a plurality of the second creasing line rolls 32*b* are disposed at predetermined intervals in the width direction Db of the cardboard sheet S. The first creasing line roll 32*a* that is disposed on the lower side performs creasing line processing on the back surface (lower surface) of the cardboard sheet S, and the second creasing line roll 32*b* that is disposed on the lower side performs creasing line processing on the back surface (lower surface) of the cardboard sheet S similarly to the first creasing line roll 32*a*. Each of the creasing line rolls 32*a* and 32*b* is provided with receiving rolls 35*a* and 35*b* rotatable in synchronization at facing upper positions.

The first slotter head 34*a* is formed in a circular shape, and a plurality of the first slotter heads 34*a* are disposed at predetermined intervals in the width direction Db of the cardboard sheet S. The first slotter head 34*a* performs grooving at a predetermined position in the transported cardboard sheet S and is capable of performing glue tab processing. The second slotter head 34*b* is formed in a circular shape, and a plurality of the second slotter heads 34*b* are disposed at predetermined intervals in the width direction Db of the cardboard sheet S. The second slotter head 34*b* performs grooving at a predetermined position in the transported cardboard sheet S and is capable of performing glue tab processing.

Each of the slitter head 33 and the third slotter head 34*c* is formed in a circular shape, and a plurality of the slitter heads 33 and a plurality of the third slotter heads 34*c* are disposed at predetermined intervals in the width direction Db of the cardboard sheet S. The slitter head 33 is capable of cutting the end portion of the transported cardboard sheet S in the width direction Db. The third slotter head 34*c* performs grooving at a predetermined position in the transported cardboard sheet S and is capable of performing glue tab processing. Each of the slotter heads 34*a*, 34*b*, and 34*c* is provided with lower knives 36*a*, 36*b*, and 36*c* rotatable in synchronization at facing lower positions.

The die cutting section 41 performs punching of a hand hole or the like on the cardboard sheet S. The die cutting section 41 has a pair of upper and lower feed pieces 42, an anvil cylinder 43, and a knife cylinder 44. The feed pieces 42 sandwich the cardboard sheet S from above and below, transport the cardboard sheet S, and are rotatably provided. Each of the anvil cylinder 43 and the knife cylinder 44 is formed in a circular shape, and the anvil cylinder 43 and the knife cylinder 44 can be rotated in synchronization by a drive device (not illustrated). In this case, an anvil is mounted onto the outer peripheral portion of the anvil cylinder 43, and a knife attachment base (punching knife) is attached at a predetermined position in the outer peripheral portion of the knife cylinder 44.

The folding section 51 forms the flat cardboard box B by folding the cardboard sheet S while moving the cardboard sheet S in the transport direction Da and bonding both end portions in the width direction Db. The folding section 51 has an upper transport belt 52, lower transport belts 53 and 54, and a forming device 55. The upper transport belt 52 and the lower transport belts 53 and 54 sandwich the cardboard sheet S and the cardboard box B from above and below and transport the cardboard sheet S and the cardboard box B. The forming device 55 has a pair of left and right forming belts and folds each end portion of the cardboard sheet S in the width direction Db while bending the end portion downward with this forming belt. In addition, the folding section 51 is provided with a gluing device 56. This gluing device 56 has a glue gun and is capable of performing glue application at a predetermined position in the cardboard sheet S by discharging glue at a predetermined timing.

The counter-ejector section 61 stacks the cardboard box B while counting the cardboard box B, sorts the cardboard box B into a predetermined number of batches, and then discharges the batches. The counter-ejector section 61 has a hopper device 62. This hopper device 62 has an elevator 63 on which the cardboard box B is stacked, the elevator 63 can be lifted and lowered, and this elevator 63 is provided with a front stopper plate (not illustrated) and a squaring plate (not illustrated) as folding accuracy improvement. It should be noted that an unloading conveyor 64 is provided below the hopper device 62.

The dividing device 71, which is movable to a use position and a retreat position, is used when the carton-forming machine 10A has produced the connected cardboard box body B0, in which the two cardboard boxes B are connected along the transport direction Da, by processing the double box sheet S0. The dividing device 71 moves to the retreat position when the carton-forming machine 10A produces the cardboard box B by processing the single box sheet. On the other hand, the dividing device 71 moves to the use position when the carton-forming machine 10A produces the connected cardboard box body B0 by processing the double box sheet S0. The dividing device 71 produces the cardboard box B (B1 and B2) by cutting the connected cardboard box body B0 into two pieces. The dividing device 71 has a loading device 72, a cutting device 73, and an unloading device 74. The loading device 72 receives a plurality of the connected cardboard box bodies B0 transported by the transport conveyor 81 from the counter-ejector section 61 and supplies the connected cardboard box bodies B0 to the cutting device 73. The cutting device 73 produces the cardboard boxes B1 and B2 by dividing the connected cardboard box body B0 into one front part and one rear part. The unloading device 74 receives the cardboard boxes B1 and B2 divided into two from the cutting device 73 and unloads the cardboard boxes B1 and B2.

Figure 21:
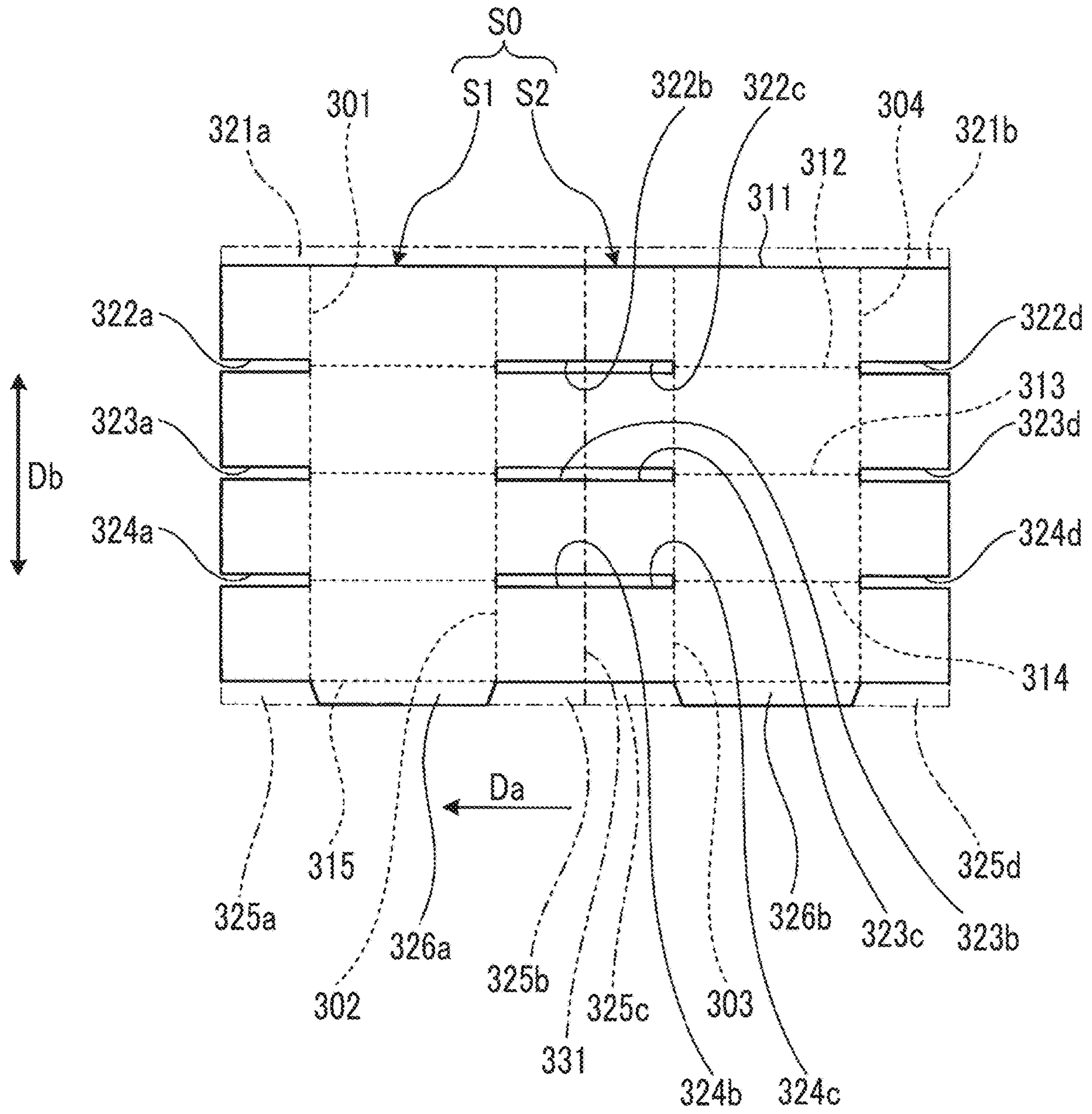
FIG. 21 is a plan view illustrating a double box sheet that is yet to be folded.

Next, a method for producing the cardboard box B (B1 and B2) by processing the double box sheet S0 by means of the cardboard box production device 10 of the present embodiment will be briefly described. FIG. 21 is a plan view illustrating the double box sheet that is yet to be folded.

As illustrated in FIG. 21, the double box sheet S0 is formed by glue application of a corrugated medium between a bottom liner and a top liner and cut in advance into a size that allows the two cardboard boxes B to be produced. In other words, the double box sheet S0 has a size obtained by single box sheets S1 and S2 being connected. The double box sheet S0 has four folding lines 301, 302, 303, and 304 formed in a previous step. The folding lines 301, 302, 303, and 304 are for folding a flap when the cardboard box B produced by the carton-forming machine 10A is assembled later.

As illustrated in FIG. 1, the double box sheet S0 on which each of the folding lines 301, 302, 303, and 304 is formed is stacked on the table 12 in the sheet feeding section 11. The double box sheet S0 stacked on the table 12 is positioned by the front pad 13 and ejected by the plurality of supplying rollers 14 by the table 12 being lowered. Then, the double box sheet S0 is supplied to the printing section 21 at a predetermined constant speed by a pair of the feed rolls 16.

In each of the printing units 21A, 21B, 21C, and 21D in the printing section 21, ink is supplied from the ink chamber 24 to the surface of the ink supply roll 23, and the ink on the surface of the ink supply roll 23 is transferred to the printing plate 26 when the printing cylinder 22 and the ink supply roll 23 rotate. When the double box sheet S0 is subsequently transported between the printing cylinder 22 and the receiving roll 25, the double box sheet S0 is sandwiched by the printing plate 26 and the receiving roll 25, and printing is performed on the surface by the printing pressure being imparted here. The printed double box sheet S0 is transported to the slotter creaser section 31 by the feed roll.

When the double box sheet S0 passes through the first creasing line roll 32*a* in the slotter creaser section 31, creasing lines 312, 313, 314, and 315 are formed on the back surface (top liner) side as illustrated in FIG. 21. In addition, when the double box sheet S0 passes through the second creasing line roll 32*b*, the creasing lines 312, 313, 314, and 315 are formed again on the back surface (top liner) side of the cardboard sheet S similarly to the first creasing line roll 32*a*.

When the double box sheet S0 in which the creasing lines 312, 313, 314, and 315 are formed passes through the slitter head 33, end portions 321*a* and 321*b* are cut at a cutting position 311. In addition, when the double box sheet S0 passes through the first, second, and third slotter heads 34*a*, 34*b*, and 34*c*, grooves 322*a*, 322*b*, 322*c*, 322*d*, 323*a*, 323*b*, 323*c*, 323*d*, 324*a*, 324*b*, 324*c*, and 324*d* are formed at the positions of the creasing lines 312, 313, and 314. At this time, glue tabs 326*a* and 326*b* are formed by end portions 325*a*, 325*b*, 325*c*, and 325*d* being cut at the position of the creasing line 315. Subsequently, the double box sheet S0 is transported to the die cutting section 41 as illustrated in FIG. 1.

In the die cutting section 41, a hand hole (not illustrated) is formed when the double box sheet S0 passes between the anvil cylinder 43 and the knife cylinder 44. However, the hand hole processing is appropriately performed in accordance with the type of the double box sheet S0, and the knife attachment base (punching knife) for performing the hand hole processing is removed from the knife cylinder when the hand hole is unnecessary. In the present embodiment, the hand hole processing of the double box sheet S0 by the die cutting section 41 is omitted, and the double box sheet S0 passes between the anvil cylinder 43 and the knife cylinder 44 that rotate.

In the folding section 51, the gluing device 56 applies glue to the glue tabs 326*a* and 326*b* as illustrated in FIG. 21 while the double box sheet S0 is moved in the transport direction Da by the upper transport belt 52 and the lower transport belts 53 and 54, and then the double box sheet S0 is folded downward from the creasing lines 312 and 314 by the forming device 55. When this folding is advanced to nearly 180 degrees, the folding force becomes stronger, the glue tabs 326*a* and 326*b* and the end portion of the double box sheet S0 are pressed and adhere to each other, both end portions of the double box sheet S0 are bonded, and the connected cardboard box body B0 is formed. Then, this connected cardboard box body B0 is transported to the counter-ejector section 61 as illustrated in FIG. 1.

In the counter-ejector section 61, the connected cardboard box body B0 is sent to the hopper device 62, the leading edge portion of the connected cardboard box body B0 in the transport direction Da hits the front stopper plate, and the connected cardboard box body B0 is stacked onto the elevator 63 in a state where the connected cardboard box body B0 is shaped by the squaring plate. Then, when a predetermined number of the cardboard boxes B are stacked on the elevator 63, this elevator 63 descends and a predetermined number of the connected cardboard box bodies B0 are discharged as one batch by the unloading conveyor 64. Then, the predetermined number of stacked connected cardboard box bodies B0 are sent to the dividing device 71 by the transport conveyor 81.

In the dividing device 71, the plurality of connected cardboard box bodies B0 transported by the transport conveyor 81 from the counter-ejector section 61 are supplied to the loading device 72. The loading device 72 receives the plurality of stacked connected cardboard box bodies B0 and supplies the stacked connected cardboard box bodies B0 to the cutting device 73. The cutting device 73 produces the cardboard boxes B1 and B2 by dividing the plurality of connected cardboard box bodies B0 into one front part and one rear part by cutting the plurality of connected cardboard box bodies B0 at the position of a two-dot chain line 331 (see FIG. 21) along the width direction Db. The unloading device 74 receives and unloads the cardboard boxes B1 and B2 divided into two by the cutting device 73.

Figure 2:
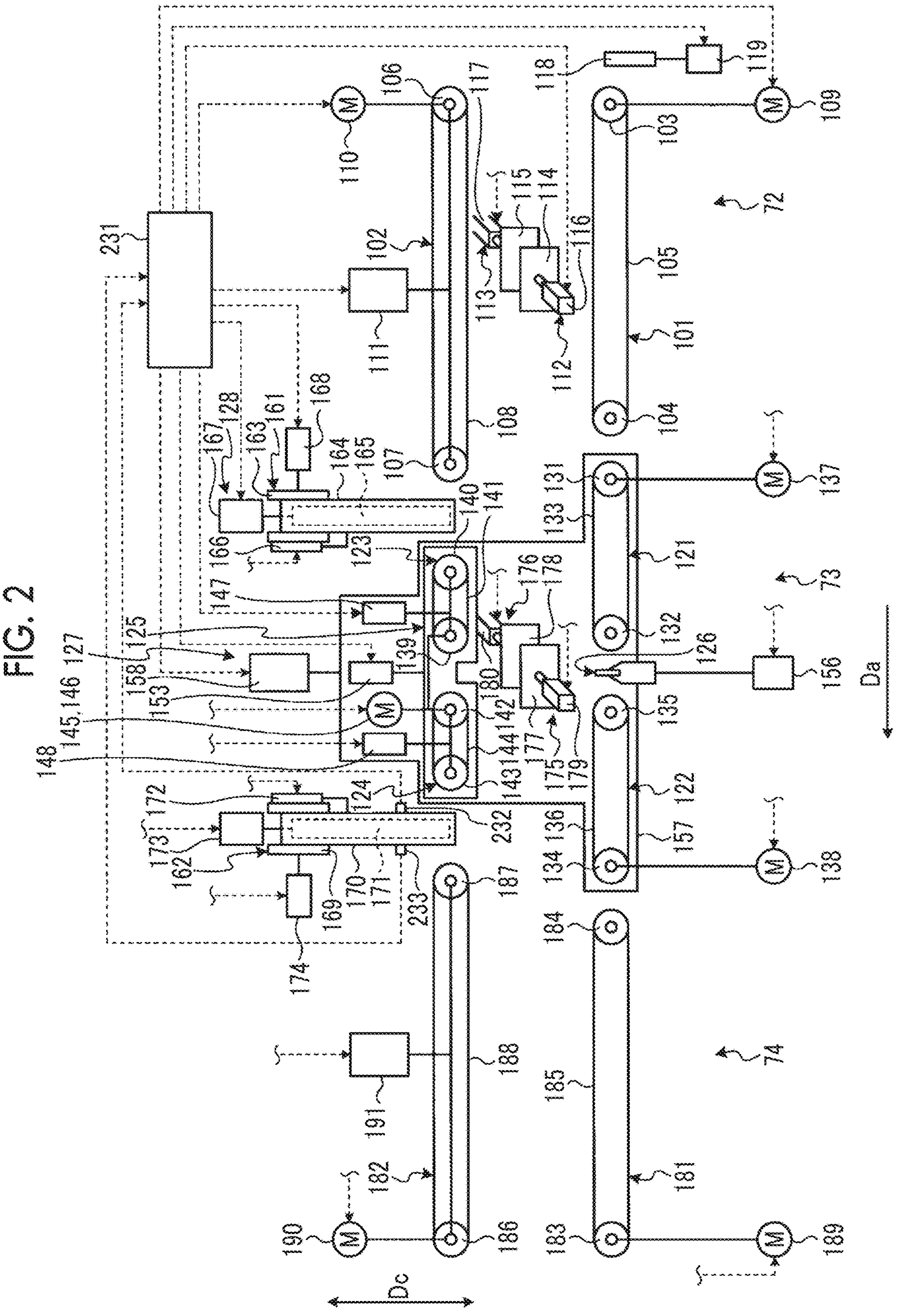
FIG. 2 is a schematic configuration diagram illustrating a cardboard box dividing device of the present embodiment.

Here, the dividing device 71 in the cardboard box production device 10 of the present embodiment will be described in detail first. FIG. 2 is a schematic configuration diagram illustrating the cardboard box dividing device of the present embodiment, FIG. 3 is a plan view illustrating an upper conveyor in the cardboard box dividing device, and FIG. 4 is a plan view illustrating a lower conveyor in the cardboard box dividing device.

Figure 3:
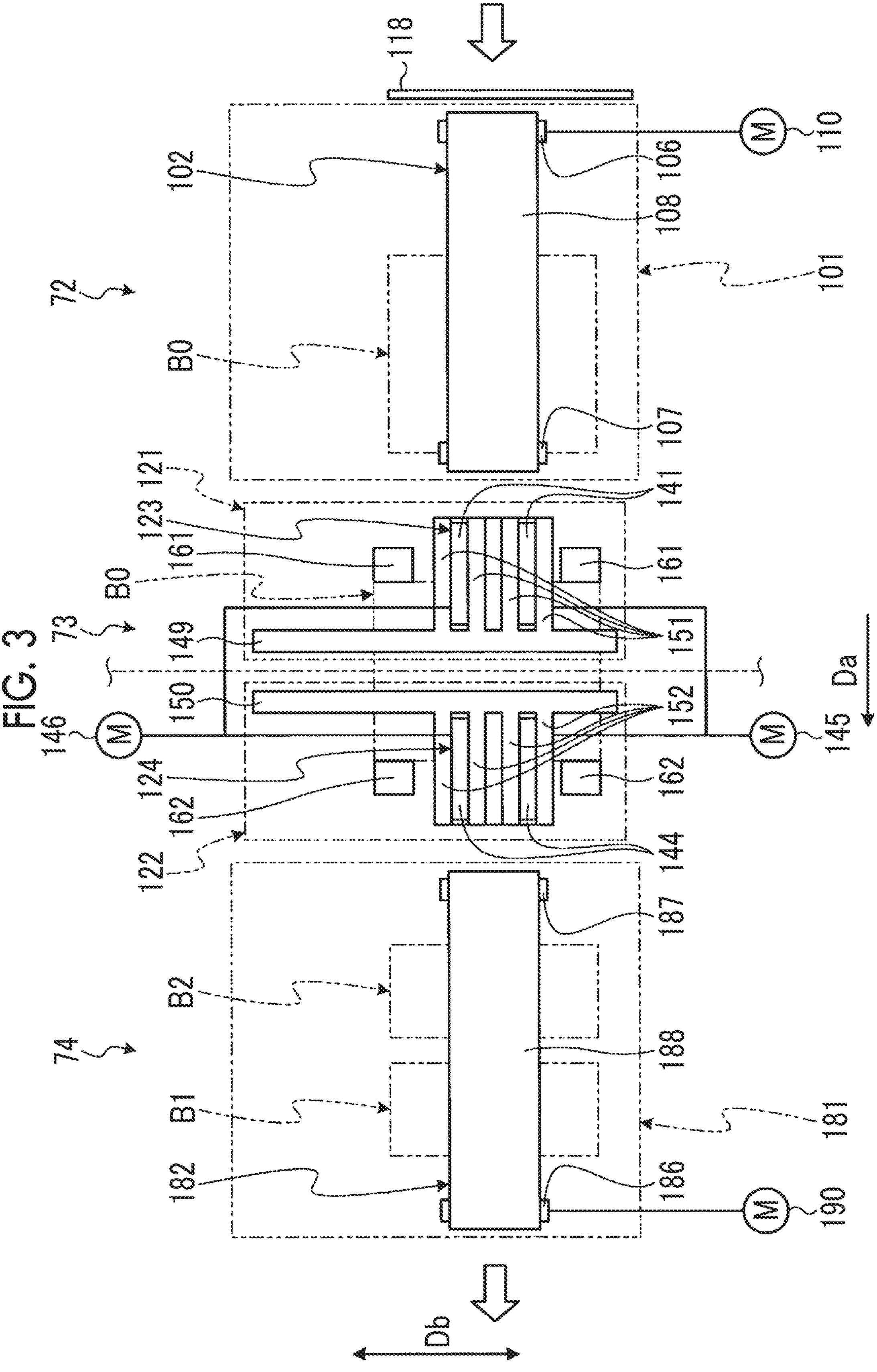
FIG. 3 is a plan view illustrating an upper conveyor in the cardboard box dividing device.
Figure 4:
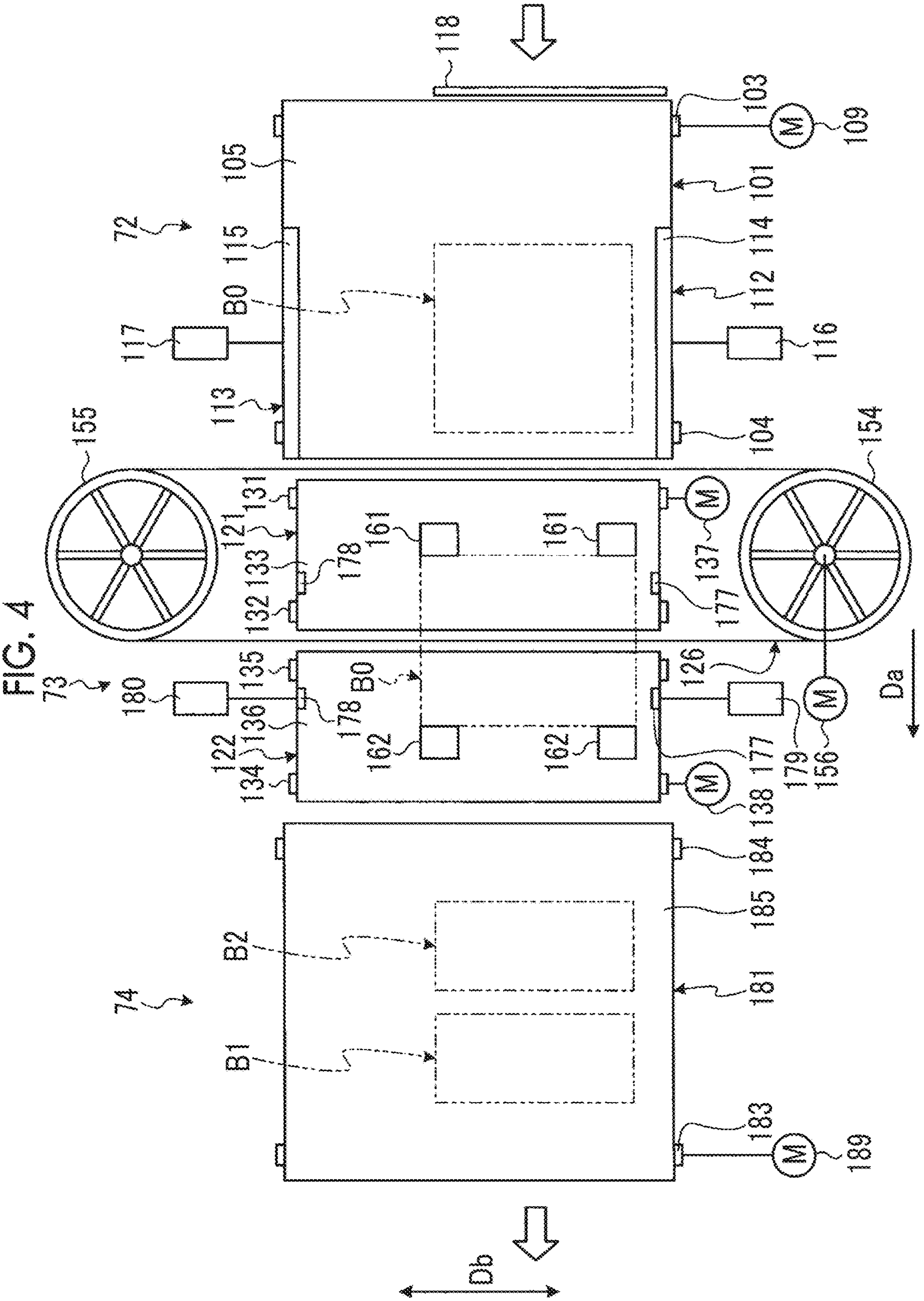
FIG. 4 is a plan view illustrating a lower conveyor in the cardboard box dividing device.

As illustrated in FIGS. 2 to 4, the dividing device 71 has the loading device 72, the cutting device 73, and the unloading device 74. The loading device 72, the cutting device 73, and the unloading device 74 are disposed along the transport direction Da of the connected cardboard box body B0 or the cardboard box B (B1 and B2). The loading device 72 supplies the plurality of stacked connected cardboard box bodies B0 to the cutting device 73 and has a loading lower conveyor 101 and a loading upper conveyor 102. The loading lower conveyor 101 and the loading upper conveyor 102 are disposed so as to face each other at a predetermined interval in the thickness direction Dc of the cardboard sheet S. Although the loading lower conveyor 101 and the loading upper conveyor 102 have substantially the same length in the transport direction Da, the length of the loading upper conveyor 102 in the width direction Db is shorter than the length of the loading lower conveyor 101 in the width direction Db.

The loading lower conveyor 101 is configured by an endless transport belt 105 stretching between a driving roller 103 and a driven roller 104. The loading upper conveyor 102 is configured by an endless transport belt 108 stretching between a driving roller 106 and a driven roller 107. It should be noted that the slack of the transport belts 105 and 108 is prevented by a plurality of rollers (not illustrated) being respectively disposed between the driving rollers 103 and 106 and the driven rollers 104 and 107 in the loading lower conveyor 101 and the loading upper conveyor 102. The loading lower conveyor 101 is provided with a drive motor 109 capable of driving and rotating the driving roller 103. The loading upper conveyor 102 is provided with a drive motor 110 capable of driving and rotating the driving roller 106. In addition, the loading upper conveyor 102 is supported such that the loading upper conveyor 102 can be moved up and down by a loading upper conveyor moving device 111.

The loading device 72 has a left side portion alignment device 112 and a right side portion alignment device 113. The left side portion alignment device 112 and the right side portion alignment device 113 are disposed so as to face each other in the width direction Db. Alignment plates 114 and 115, which face each other in the width direction Db, and drive cylinders 116 and 117, which respectively move the alignment plates 114 and 115 along the width direction Db, constitute the left side portion alignment device 112 and the right side portion alignment device 113, respectively. It should be noted that the positions of the left side portion alignment device 112 and the right side portion alignment device 113 can be adjusted in the width direction Db in accordance with the width dimension of the connected cardboard box body B0 to be processed.

The loading device 72 has an opening-closing door 118. The opening-closing door 118 has a plate shape disposed along the width direction Db and the thickness direction Dc upstream of the loading lower conveyor 101 in the transport direction Da. The opening-closing door 118 can be moved along the thickness direction Dc by a drive cylinder 119 and is movable to a closed position positioned above the loading lower conveyor 101 and an open position positioned below the loading lower conveyor 101.

The cutting device 73 cuts a connected cardboard box laminate in which a plurality of the connected cardboard box bodies B0 are stacked in the thickness direction Dc along the width direction Db and divides the laminate into the two cardboard boxes B1 and B2. The cutting device 73 has an inlet side lower conveyor 121 and an outlet side lower conveyor 122 as lower conveyors, an inlet side upper conveyor 123 and an outlet side upper conveyor 124 as upper conveyors, a pressing device 125, a cutting knife 126, a lifting/lowering device 127, and a positioning device 128.

The inlet side lower conveyor 121 and the outlet side lower conveyor 122 stack and transport the plurality of connected cardboard box bodies B0, the inlet side lower conveyor 121 and the outlet side lower conveyor 122 have the same length as the loading lower conveyor 101 in the width direction Db, and the length of each of the inlet side lower conveyor 121 and the outlet side lower conveyor 122 is approximately half of the length of the loading lower conveyor 101 in the transport direction Da. The inlet side lower conveyor 121 and the outlet side lower conveyor 122 have the same length in the width direction Db and have the same length in the transport direction Da. The inlet side lower conveyor 121 and the outlet side lower conveyor 122 are disposed with a predetermined gap in the transport direction Da.

The inlet side lower conveyor 121 is configured by an endless transport belt 133 stretching between a driving roller 131 and a driven roller 132. The outlet side lower conveyor 122 is configured by an endless transport belt 136 stretching between a driving roller 134 and a driven roller 135. It should be noted that the slack of the transport belts 133 and 136 is prevented by a plurality of rollers (not illustrated) being respectively disposed between the driving rollers 131 and 134 and the driven rollers 132 and 135 in the inlet side lower conveyor 121 and the outlet side lower conveyor 122. The inlet side lower conveyor 121 is provided with a drive motor 137 capable of driving and rotating the driving roller 131. The outlet side lower conveyor 122 is provided with a drive motor 138 capable of driving and rotating the driving roller 134.

The inlet side upper conveyor 123 and the outlet side upper conveyor 124 support and transport the upper portions of the plurality of connected cardboard box bodies B0 stacked on the inlet side lower conveyor 121 and the outlet side lower conveyor 122, a plurality of (two in the present embodiment) conveyors constitute the inlet side upper conveyor 123 and the outlet side upper conveyor 124, and the plurality of conveyors are shorter in length than the inlet side lower conveyor 121 and the outlet side lower conveyor 122 in the width direction Db and the transport direction Da. The inlet side upper conveyor 123 and the outlet side upper conveyor 124 are disposed with a predetermined gap in the transport direction Da.

The inlet side upper conveyor 123 is disposed so as to face the inlet side lower conveyor 121 from above and is configured by an endless transport belt 141 stretching between a driving roller 139 and a driven roller 140. The outlet side upper conveyor 124 is disposed so as to face the outlet side lower conveyor 122 from above and is configured by an endless transport belt 144 stretching between a driving roller 142 and a driven roller 143. As for the inlet side upper conveyor 123 and the outlet side upper conveyor 124, two conveyors are disposed side by side at a predetermined interval in the width direction Db. In addition, the inlet side upper conveyor 123 and the outlet side upper conveyor 124 that are on the left side with respect to the transport direction Da are provided with a drive motor 145 capable of driving and rotating each of the driving rollers 139 and 142, and the inlet side upper conveyor 123 and the outlet side upper conveyor 124 that are on the right side with respect to the transport direction Da are provided with a drive motor 146 capable of driving and rotating each of the driving rollers 139 and 142.

The inlet side upper conveyor 123 and the outlet side upper conveyor 124 are supported such that the inlet side upper conveyor 123 and the outlet side upper conveyor 124 can be moved up and down by an inlet side upper conveyor moving device 147 and an outlet side upper conveyor moving device 148.

The pressing device 125 presses, from above, the plurality of connected cardboard box bodies B0 stacked on the inlet side lower conveyor 121 and the outlet side lower conveyor 122. The pressing device 125 has width direction pressing members 149 and 150 that are along the width direction Db above the inlet side lower conveyor 121 and the outlet side lower conveyor 122 and a plurality of transport direction pressing members 151 and 152 that are along the transport direction Da. The width direction pressing member 149 is disposed in the downstream portion of the inlet side upper conveyor 123 and is configured by the plurality of transport direction pressing members 151 extending from the width direction pressing member 149 to the upstream side in the transport direction Da. The width direction pressing member 150 is disposed in the upstream portion of the outlet side upper conveyor 124 and is configured by the plurality of transport direction pressing members 152 extending from the width direction pressing member 150 to the downstream side in the transport direction Da. The pressing device 125 is supported such that the pressing device 125 can be moved up and down by a pressing drive device 153.

The cutting knife 126 is disposed along the width direction Db between the inlet side lower conveyor 121 and the outlet side lower conveyor 122, and a knife portion is formed along the upper portion of the cutting knife 126. The cutting knife 126, which has an endless shape, is supported by being wound around a driving pulley 154 and a driven pulley 155 disposed on both sides of the inlet side lower conveyor 121 in the width direction Db. A cutting knife drive device 156 is capable of driving and rotating the driving pulley 154, and the cutting knife drive device 156 is capable of moving the cutting knife 126 in the width direction Db between the inlet side lower conveyor 121 and the outlet side lower conveyor 122 by the driving pulley 154 rotating. It should be noted that the cutting knife 126 has a cutting position between the inlet side lower conveyor 121 and the outlet side lower conveyor 122 and simply moves between the inlet side lower conveyor 121 and the loading lower conveyor 101.

The lifting/lowering device 127 relatively moves the cutting knife 126 and the plurality of connected cardboard box bodies B0 on the inlet side lower conveyor 121 and the outlet side lower conveyor 122 along the up-down direction. In the present embodiment, the lifting/lowering device 127 causes the cutting knife 126 to be immovable in the up-down direction and is capable of lifting and lowering the inlet side lower conveyor 121, the outlet side lower conveyor 122, the inlet side upper conveyor 123, the outlet side upper conveyor 124, and the pressing device 125 along the up-down direction. The inlet side lower conveyor 121, the outlet side lower conveyor 122, the inlet side upper conveyor 123, the outlet side upper conveyor 124, and the pressing device 125 are supported by a lifting/lowering base 157. A lifting/ lowering drive device 158 is capable of lifting and lowering the lifting/lowering base 157 along the up-down direction, and the inlet side lower conveyor 121, the outlet side lower conveyor 122, the inlet side upper conveyor 123, the outlet side upper conveyor 124, and the pressing device 125 are lifted and lowered by the lifting/lowering base 157 being lifted and lowered. In other words, by the lifting/lowering base 157 being lowered, the plurality of connected cardboard box bodies B0 supported by the inlet side lower conveyor 121, the outlet side lower conveyor 122, the inlet side upper conveyor 123, the outlet side upper conveyor 124, and the pressing device 125 are lowered and the plurality of connected cardboard box bodies B0 are cut by the cutting knife 126.

The positioning device 128 positions, in the transport direction Da, the plurality of connected cardboard box bodies B0 supplied on the inlet side lower conveyor 121 and the outlet side lower conveyor 122. The positioning device 128 has two upstream side positioning members 161 and two downstream side positioning members 162. The upstream side positioning member 161 is movable along the transport direction Da and the thickness direction Dc of the connected cardboard box body B0 in the upstream portion of the inlet side lower conveyor 121. The downstream side positioning member 162 is movable along the transport direction Da and the thickness direction Dc of the connected cardboard box body B0 in the downstream portion of the outlet side lower conveyor 122. The upstream side positioning member 161 and the downstream side positioning member 162 can be independently moved by a positioning drive device.

The upstream side positioning member 161 forms a telescopic structure in which a supporting cylinder 163, an outer cylinder 164, and an inner cylinder 165 are mutually fitted. A first drive device 166 is capable of lifting and lowering the outer cylinder 164 along the thickness direction Dc with respect to the fixed supporting cylinder 163, and a second drive device 167 is capable of lifting and lowering the inner cylinder 165 along the thickness direction Dc with respect to the outer cylinder 164. In addition, a third drive device 168 is capable of moving the supporting cylinder 163 along with the outer cylinder 164 and the inner cylinder 165 along the transport direction Da. The downstream side positioning member 162 forms a telescopic structure in which a supporting cylinder 169, an outer cylinder 170, and an inner cylinder 171 are mutually fitted. A first drive device 172 is capable of lifting and lowering the outer cylinder 170 along the thickness direction Dc with respect to the fixed supporting cylinder 169, and a second drive device 173 is capable of lifting and lowering the inner cylinder 171 along the thickness direction Dc with respect to the outer cylinder 170. In addition, a third drive device 174 is capable of moving the supporting cylinder 169 along with the outer cylinder 170 and the inner cylinder 171 along the transport direction Da.

The upstream side positioning member 161 forms the telescopic structure in which the supporting cylinder 163, the outer cylinder 164, and the inner cylinder 165 are mutually fitted, and thus the width of the outer cylinder 164 in the transport direction Da is smaller than the width of the supporting cylinder 163 in the transport direction Da and the width of the inner cylinder 165 in the transport direction Da is smaller than the width of the outer cylinder 164 in the transport direction Da. In addition, likewise, the downstream side positioning member 162 forms the telescopic structure in which the supporting cylinder 169, the outer cylinder 170, and the inner cylinder 171 are mutually fitted, and thus the width of the outer cylinder 170 in the transport direction Da is smaller than the width of the supporting cylinder 169 in the transport direction Da and the width of the inner cylinder 171 in the transport direction Da is smaller than the width of the outer cylinder 170 in the transport direction Da. Here, the drive devices 166, 167, 168, 172, 173, and 174 constitute the positioning drive device.

The cutting device 73 has a left side portion alignment device 175 and a right side portion alignment device 176. The left side portion alignment device 175 and the right side portion alignment device 176 are disposed so as to face each other in the width direction Db. Alignment plates 177 and 178, which face each other in the width direction Db, and drive cylinders 179 and 180, which respectively move the alignment plates 177 and 178 along the width direction Db, constitute the left side portion alignment device 175 and the right side portion alignment device 176, respectively. In the present embodiment, the left side portion alignment device 175 is disposed beside the inlet side lower conveyor 121 and the outlet side lower conveyor 122, and the alignment plate 177 extends to below the inlet side lower conveyor 121 and the outlet side lower conveyor 122. On the other hand, the right side portion alignment device 176 is disposed above the inlet side lower conveyor 121 and the outlet side lower conveyor 122, and the alignment plate 178 extends to the upper surfaces of the inlet side lower conveyor 121 and the outlet side lower conveyor 122. Accordingly, in the left side portion alignment device 175, no gap is generated between the lower end portion of the alignment plate 177 and the respective upper surfaces of the lower conveyors 121 and 122, and thus it is possible to appropriately perform paper alignment in the width direction Db by aligning the plurality of connected cardboard box bodies B0 stacked on the lower conveyors 121 and 122 with the alignment plate 177 when the alignment plates 177 and 178 have moved so as to approach each other. In addition, the position of the right side portion alignment device 176 can be adjusted in the width direction Db in accordance with the width dimension of the connected cardboard box body B0 to be processed.

The unloading device 74 receives the plurality of stacked cardboard boxes B1 and B2 cut by the cutting device 73, unloads the cardboard boxes B1 and B2 to the outside, and has an unloading lower conveyor 181 and an unloading upper conveyor 182. The unloading lower conveyor 181 and the unloading upper conveyor 182 are disposed so as to face each other at a predetermined interval in the thickness direction Dc of the cardboard sheet S. Although the unloading lower conveyor 181 and the unloading upper conveyor 182 have substantially the same length in the transport direction Da, the length of the unloading upper conveyor 182 in the width direction Db is shorter than the length of the unloading lower conveyor 181 in the width direction Db.

The unloading lower conveyor 181 is configured by an endless transport belt 185 stretching between a driving roller 183 and a driven roller 184. The unloading upper conveyor 182 is configured by an endless transport belt 188 stretching between a driving roller 186 and a driven roller 187. It should be noted that the slack of the transport belts 185 and 188 is prevented by a plurality of rollers (not illustrated) being respectively disposed between the driving rollers 183 and 186 and the driven rollers 184 and 187 in the unloading lower conveyor 181 and the unloading upper conveyor 182. The unloading lower conveyor 181 is provided with a drive motor 189 capable of driving and rotating the driving roller 183. The unloading upper conveyor 182 is provided with a drive motor 190 capable of driving and rotating the driving roller 186. In addition, the unloading upper conveyor 182 is supported such that the unloading upper conveyor 182 can be moved up and down by an unloading upper conveyor moving device 191.

Figure 5:
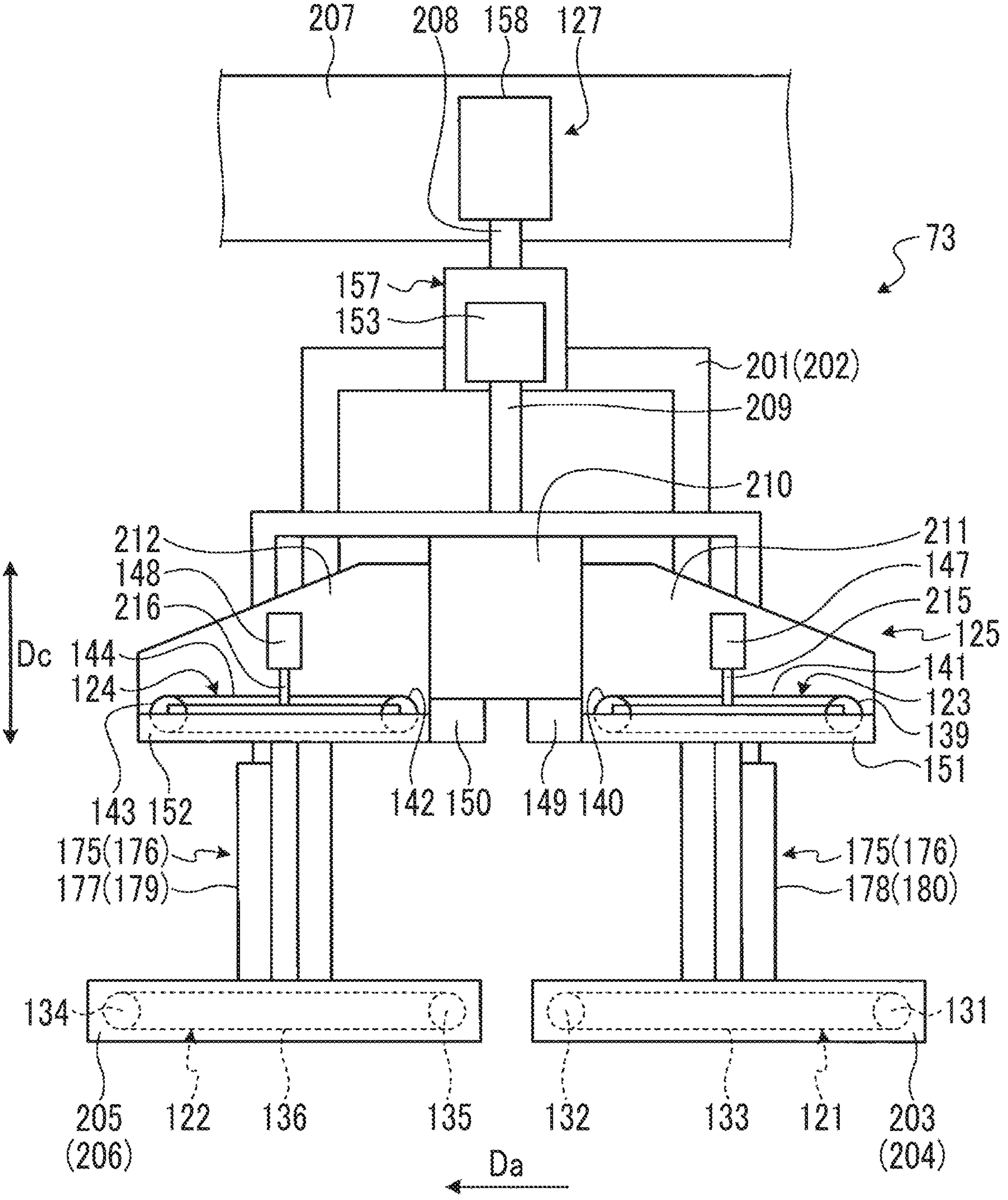
FIG. 5 is a schematic front view illustrating a cardboard box cutting device.

The cutting device 73 will be described in detail. FIG. 5 is a schematic front view illustrating the cardboard box cutting device, and FIG. 6 is a schematic side view illustrating the cardboard box cutting device.

Figure 6:
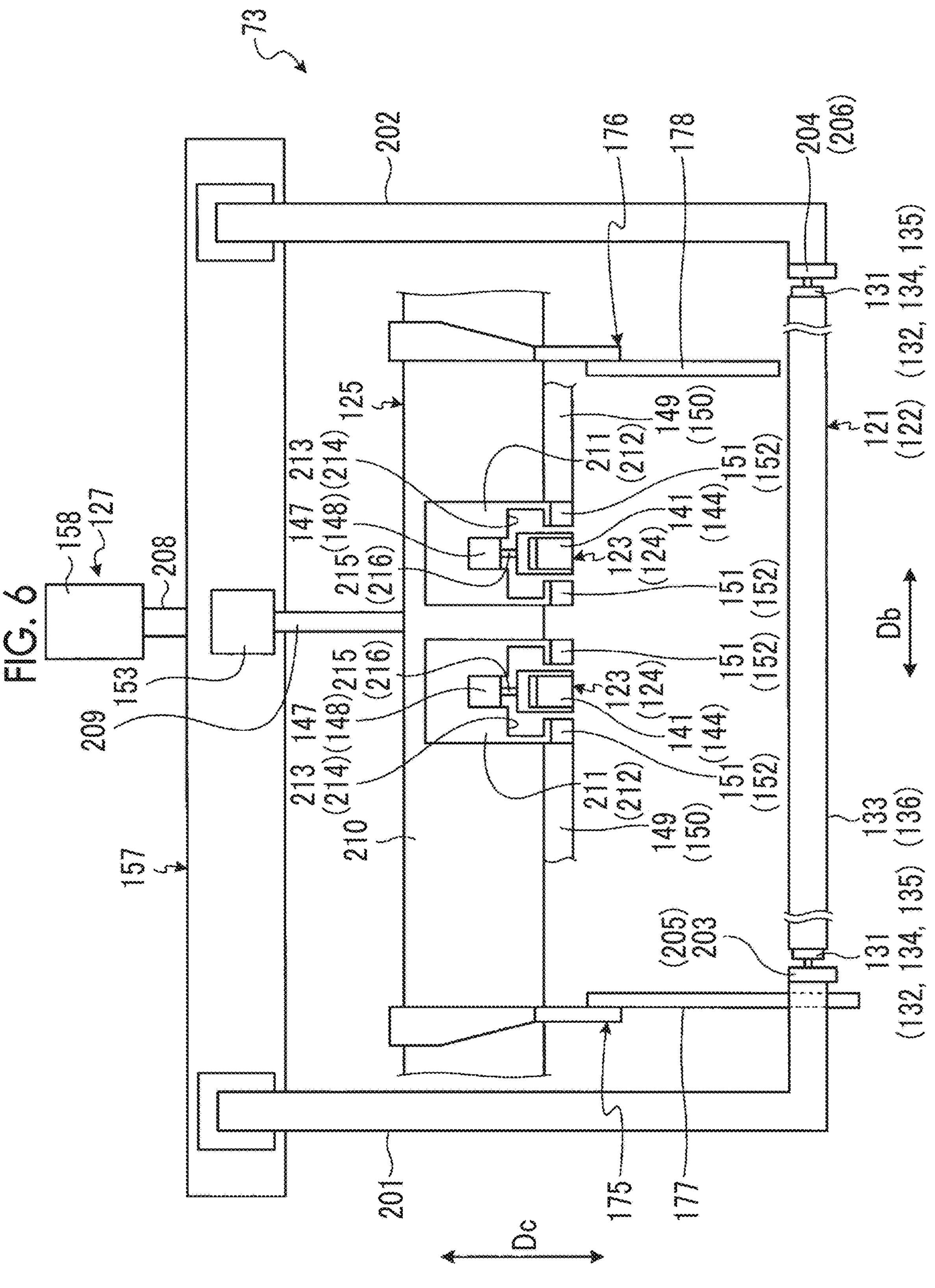
FIG. 6 is a schematic side view illustrating the cardboard box cutting device.

As illustrated in FIGS. 5 and 6, the lifting/lowering base 157 has a beam shape along the horizontal direction, and frame bodies 203, 204, 205, and 206 in the inlet side lower conveyor 121 and the outlet side lower conveyor 122 are connected via a pair of left and right connecting members 201 and 202. The lifting/lowering drive device 158 is provided in a device frame 207, and the leading edge portion of a drive rod 208 is connected to the lifting/lowering base 157.

In addition, the lifting/lowering base 157 is provided with the pressing drive device 153, and the leading edge portion of a drive rod 209 is connected to a support frame 210 of the pressing device 125. The support frame 210 is disposed along the width direction Db, two attachment frames 211 are fixed on the upstream side in the transport direction Da, and two attachment frames 212 are fixed on the downstream side. In addition, the width direction pressing member 149 and the transport direction pressing member 151 are fixed to the lower surface of the attachment frame 211, and the width direction pressing member 150 and the transport direction pressing member 152 are fixed to the lower surface of the attachment frame 212. It should be noted that the left side portion alignment device 175 and the right side portion alignment device 176 are supported by the support frame 210 and each of the alignment plates 177 and 178 hangs downward. The alignment plate 178 is movable in the width direction Db.

The inlet side upper conveyor 123 and the outlet side upper conveyor 124 are disposed in the pressing members 149, 150, 151, and 152. In the present embodiment, the inlet side upper conveyor 123 and the outlet side upper conveyor 124 are disposed in the attachment frames 211 and 212 supporting the pressing members 149, 150, 151, and 152. The attachment frames 211 and 212 are provided with space sections 213 and 214, which open downward. The inlet side upper conveyor moving device 147 is fixed to the space section 213, and the inlet side upper conveyor 123 is connected to the leading edge portion of a drive rod 215. The outlet side upper conveyor moving device 148 is fixed to the space section 214, and the outlet side upper conveyor 124 is connected to the leading edge portion of a drive rod 216.

Accordingly, when the lifting/lowering drive device 158 is driven, the drive rod 208 expands and contracts, the lifting/lowering base 157 can be lifted and lowered, and the inlet side lower conveyor 121, the outlet side lower conveyor 122, the inlet side upper conveyor 123, the outlet side upper conveyor 124, and the pressing device 125 supported by the lifting/lowering base 157 can be lifted and lowered. In addition, when the pressing drive device 153 is driven, the drive rod 209 expands and contracts and the pressing device 125, the inlet side upper conveyor 123, and the outlet side upper conveyor 124 can be lifted and lowered with respect to the lifting/lowering base 157. Further, when the conveyor moving devices 147 and 148 are driven, the drive rods 215 and 216 expand and contract and the inlet side upper conveyor 123 and the outlet side upper conveyor 124 can be lifted and lowered with respect to the pressing device 125.

As illustrated in FIG. 2, the operation of the loading device 72, the cutting device 73, and the unloading device 74 constituting the dividing device 71 can be controlled by a control device 231. The control device 231 is capable of performing drive control on the loading upper conveyor moving device 111, the drive cylinders 116, 117, and 119, and the drive motors 109 and 110 of the loading device 72. The control device 231 is capable of performing drive control on the conveyor moving devices 147 and 148, the pressing drive device 153, the lifting/lowering drive device 158, the drive devices 166, 167, 168, 172, 173, and 174, and the drive motors 137, 138, 145, and 146 of the cutting device 73. The control device 231 is capable of performing drive control on the unloading upper conveyor moving device 191 and the drive motors 189 and 190 of the unloading device 74.

Figure 7:
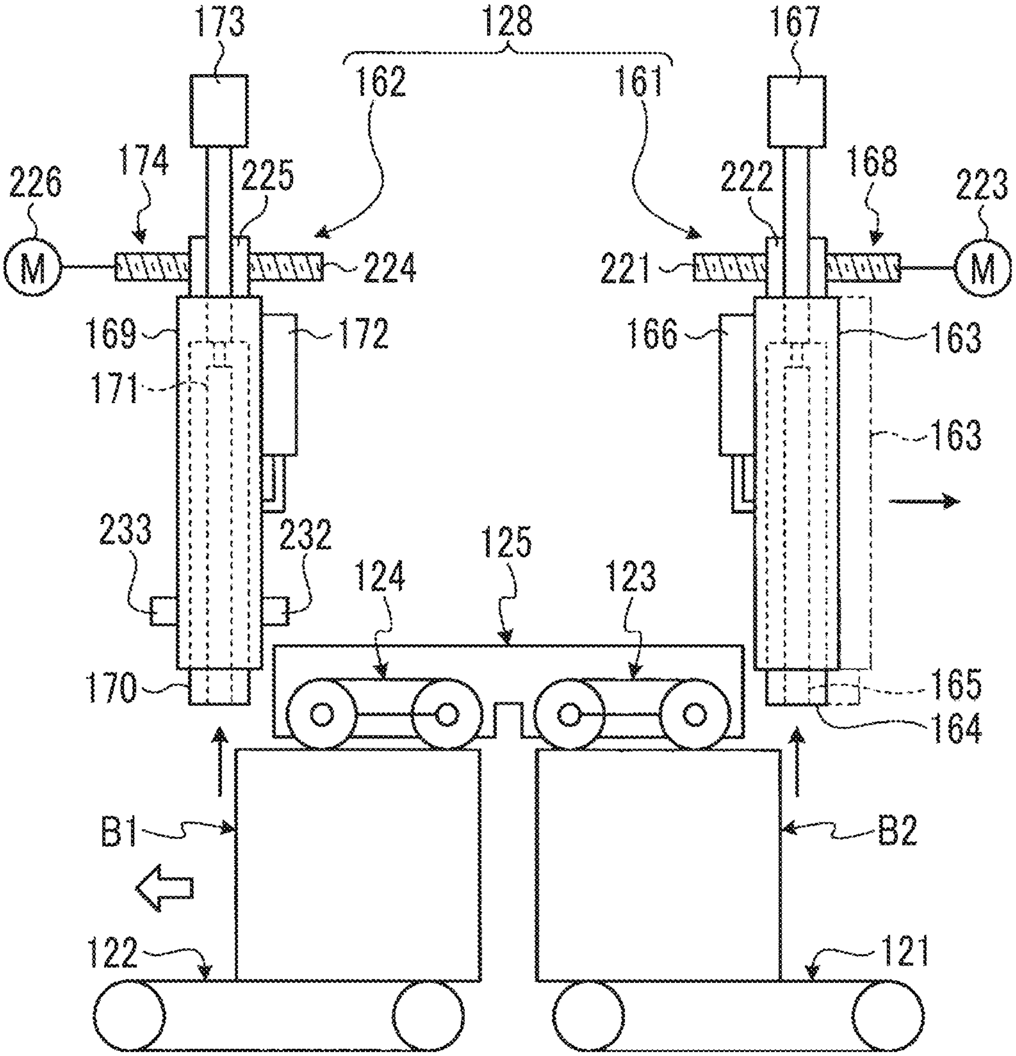
FIG. 7 is a schematic front view illustrating a cardboard box positioning device.
Figure 8:
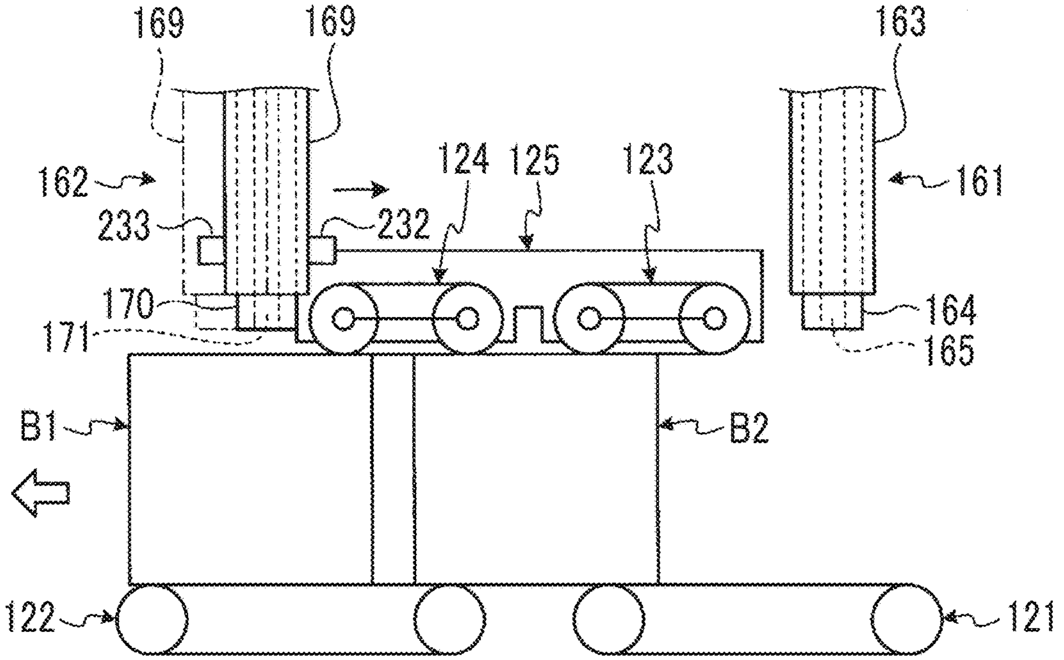
FIG. 8 is a schematic diagram illustrating the operation of the cardboard box positioning device.
Figure 9:
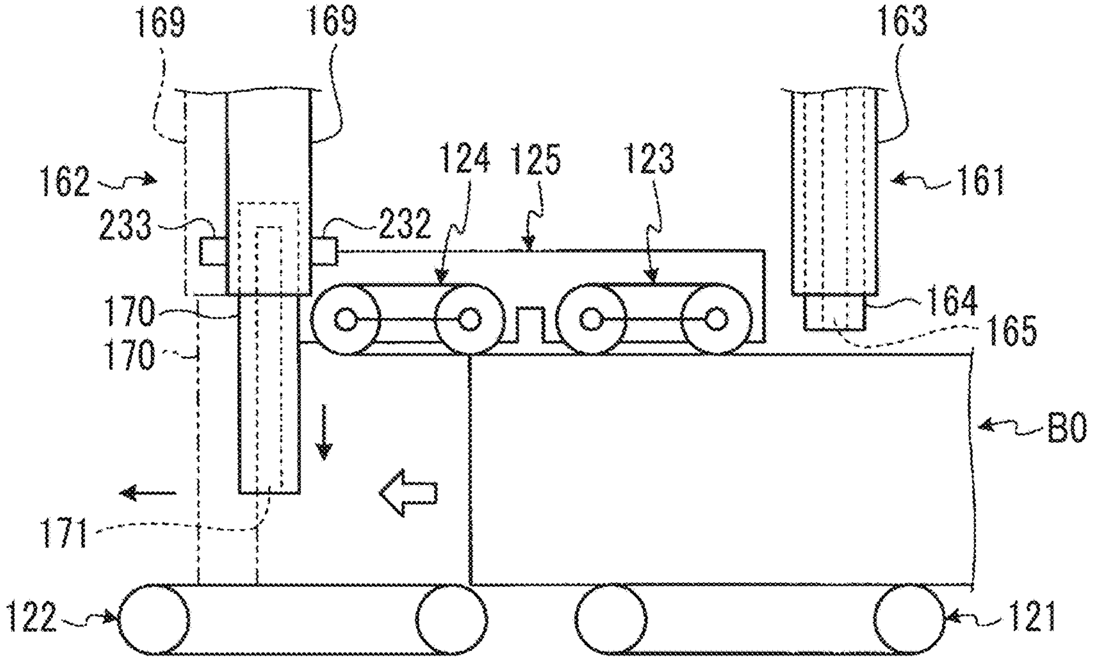
FIG. 9 is a schematic diagram illustrating the operation of the cardboard box positioning device.

Here, the operation control that the control device 231 performs on the upstream side positioning member 161 and the downstream side positioning member 162 constituting the positioning device 128 will be described. FIG. 7 is a schematic front view illustrating the cardboard box positioning device, and FIGS. 8 and 9 are schematic diagrams illustrating the operation of the cardboard box positioning device.

As illustrated in FIG. 7, in the upstream side positioning member 161, the first drive device 166 is capable of lifting and lowering the outer cylinder 164 with respect to the supporting cylinder 163, the second drive device 167 is capable of lifting and lowering the inner cylinder 165 with respect to the outer cylinder 164, and the third drive device 168 is capable of moving the supporting cylinder 163, the outer cylinder 164, and the inner cylinder 165 along the transport direction Da. Here, an air cylinder or the like constitutes the first drive device 166 and the second drive device 167, and the third drive device 168 is constituted by a screw shaft 221, a moving body 222 fixed to the supporting cylinder 163 and screwed with the screw shaft 221, and a motor 223 driving and rotating the screw shaft 221. In addition, in the downstream side positioning member 162, the first drive device 172 is capable of lifting and lowering the outer cylinder 170 with respect to the supporting cylinder 169, the second drive device 173 is capable of lifting and lowering the inner cylinder 171 with respect to the outer cylinder 170, and the third drive device 174 is capable of moving the supporting cylinder 169, the outer cylinder 170, and the inner cylinder 171 in the transport direction Da. Here, an air cylinder or the like constitutes the first drive device 172 and the second drive device 173, and the third drive device 174 is constituted by a screw shaft 224, a moving body 225 fixed to the supporting cylinder 169 and screwed with the screw shaft 224, and a motor 226 driving and rotating the screw shaft 224. The positioning drive device of the present invention is each of the drive devices 166, 167, 168, 172, 173, and 174 and is capable of independently moving the upstream side positioning member 161 and the downstream side positioning member 162.

In other words, the control device 231 operates the outer cylinders 164 and 170 and the inner cylinders 165 and 171 along the thickness direction Dc with respect to the supporting cylinders 163 and 169 by performing drive control on the first drive devices 166 and 172 and the second drive devices 167 and 173 as the lifting/lowering base 157 is lifted and lowered.

The control device 231 moves the downstream side positioning member 162 by a predetermined distance to the upstream side in the transport direction Da by performing drive control on the third drive device 174 after the cutting knife 126 cuts the plurality of connected cardboard box bodies B0 into front and rear parts and the lifting/lowering base 157, the upstream side positioning member 161, and the downstream side positioning member 162 are lifted. Specifically, the control device 231 moves the downstream side positioning member 162 by the predetermined distance to the upstream side in the transport direction Da by performing drive control on the third drive device 174 during the passage of the cut cardboard boxes B1 and B2 below the downstream side positioning member 162 by the inlet side lower conveyor 121 and the outlet side lower conveyor 122 when the upstream side positioning member 161 and the downstream side positioning member 162 are at a rise position.

In addition, the control device 231 lowers the outer cylinder 170 and the inner cylinder 171 by performing drive control on the first drive device 172 and moves the downstream side positioning member 162 by a predetermined distance to the downstream side in the transport direction Da by performing drive control on the third drive device 174 after the passage of the cut cardboard boxes B1 and B2 below the downstream side positioning member 162 by the inlet side lower conveyor 121 and the outlet side lower conveyor 122.

Here, the downstream side positioning member 162 is provided with an arrival detection sensor 232, which detects the arrival of the connected cardboard box body B0 (leading edge in the transport direction Da), on the supporting cylinder 169, and is provided with a passage detection sensor 233, which detects the passage of the cardboard boxes B1 and B2. The arrival detection sensor 232 and the passage detection sensor 233 output detection results to the control device 231. Accordingly, the control device 231 stops operating the inlet side lower conveyor 121, the outlet side lower conveyor 122, the inlet side upper conveyor 123, and the outlet side upper conveyor 124 when the arrival detection sensor 232 detects the arrival of the connected cardboard box body B0. In addition, the control device 231 starts lowering the outer cylinder 170 and the inner cylinder 171 in the downstream side positioning member 162 when the passage detection sensor 233 detects the passage of the cardboard boxes B1 and B2 below the downstream side positioning member 162.

In other words, the cut cardboard boxes B1 and B2 are lifted together with the inlet side lower conveyor 121 and the outlet side lower conveyor 122 when the connected cardboard box body B0 is cut by the cutting knife 126 by the connected cardboard box body B0 supported by the inlet side lower conveyor 121 and the outlet side lower conveyor 122 being lowered. At this time, the upstream side positioning member 161 and the downstream side positioning member 162 are lifted and lowered so as to follow the lifting and lowering of the inlet side lower conveyor 121 and the outlet side lower conveyor 122 as the inlet side lower conveyor 121 and the outlet side lower conveyor 122 are lifted and lowered. In addition, when the upstream side positioning member 161 and the downstream side positioning member 162 are lifted together with the cardboard boxes B1 and B2, the upstream side positioning member 161 is moved to the upstream side in the transport direction Da by a predetermined distance as indicated by a two-dot chain line in FIG. 7.

Then, the downstream side positioning member 162 indicated by a two-dot chain line in FIG. 8 is moved by a predetermined distance (such as the position indicated by a solid line in FIG. 8) to the upstream side in the transport direction Da when the passage detection sensor 233 detects the passage of the cardboard boxes B1 and B2 below the downstream side positioning member 162 after the upstream side positioning member 161 and the downstream side positioning member 162 are lifted as illustrated in FIG. 8. Subsequently, the outer cylinder 170 is lowered with the inner cylinder 171 held in the outer cylinder 170 and the downstream side positioning member 162 is moved by a predetermined distance (such as the position indicated by a two-dot chain line in FIG. 9) to the downstream side in the transport direction Da as illustrated in FIG. 9 when the passage detection sensor 233 detects the completion of the passage of the cardboard boxes B1 and B2 below the downstream side positioning member 162.

Figure 10:
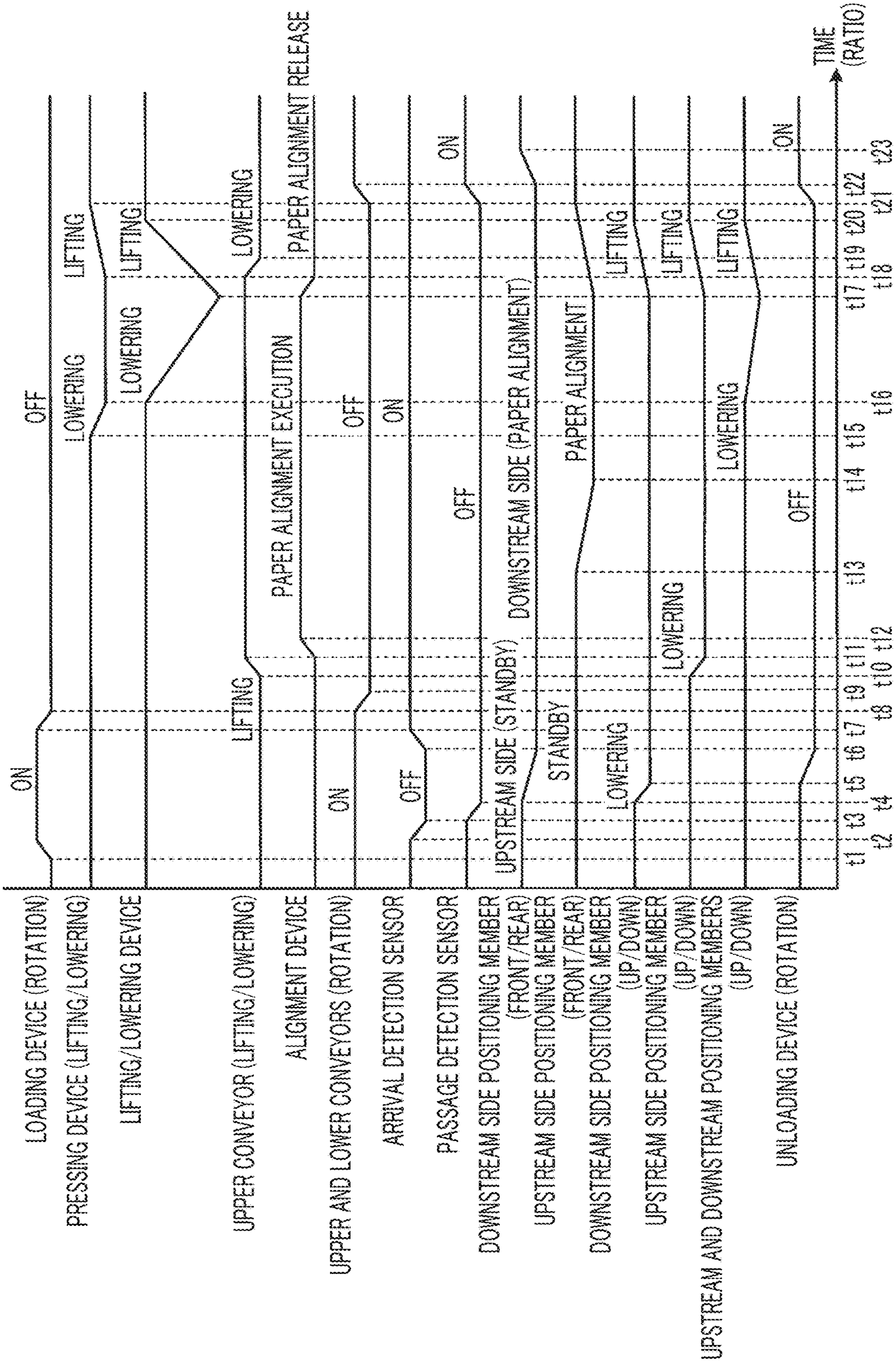
FIG. 10 is a time chart illustrating operation in the cardboard box dividing device.
Figure 12:
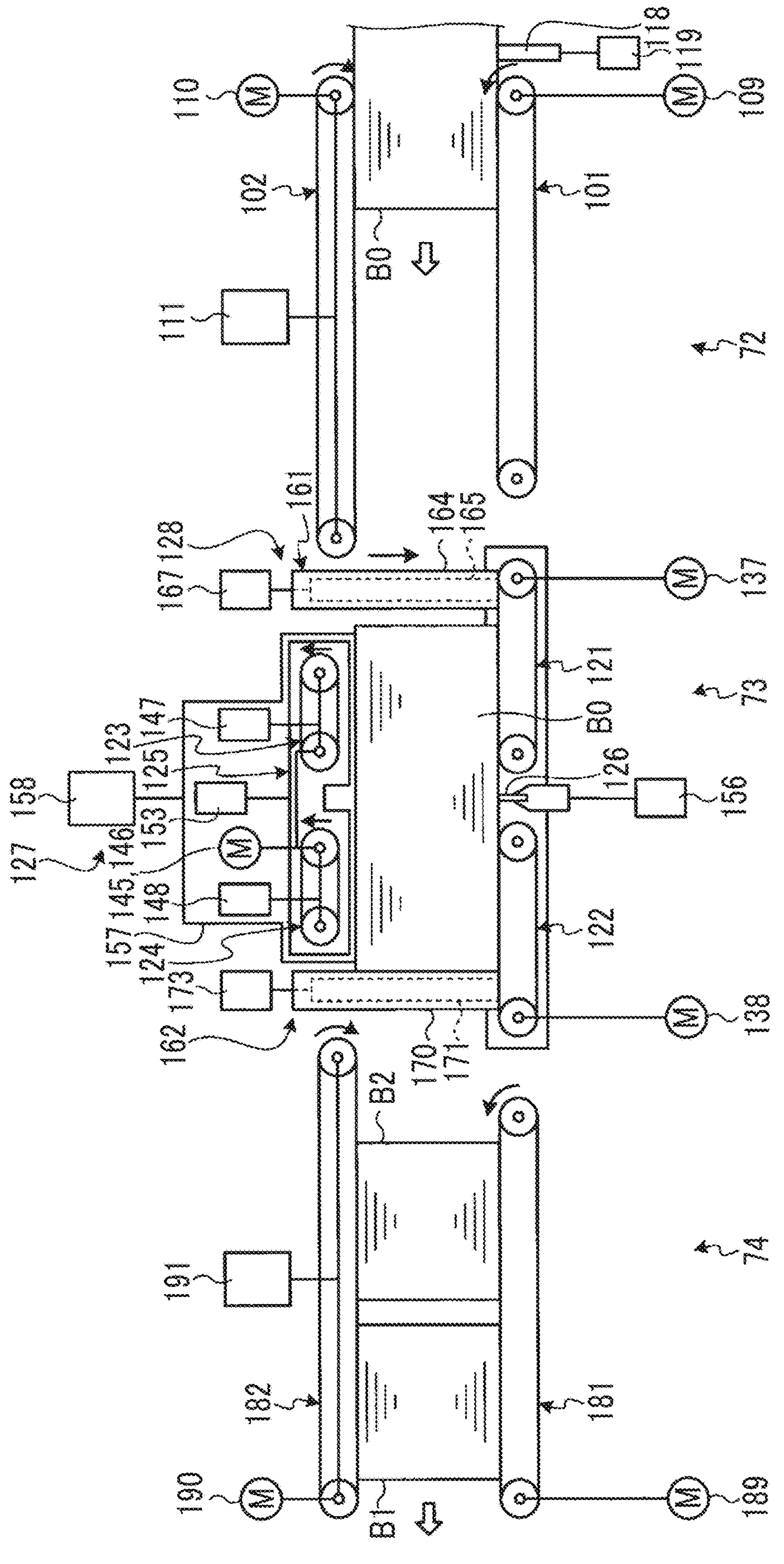
FIG. 12 is a schematic diagram illustrating the retreat state of the upper conveyor.
Figure 13:
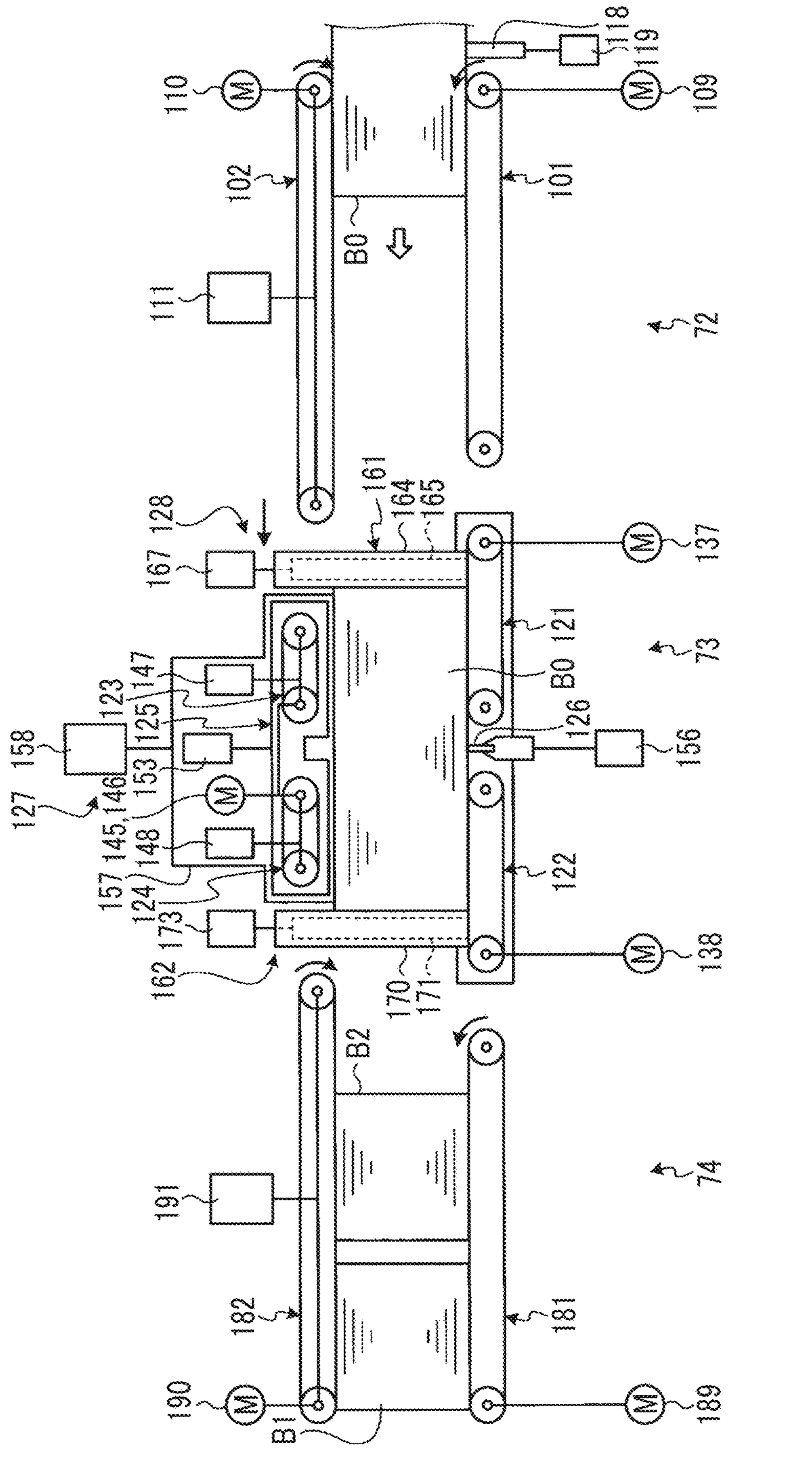
FIG. 13 is a schematic diagram illustrating the state of positioning by a positioning member.
Figure 14:
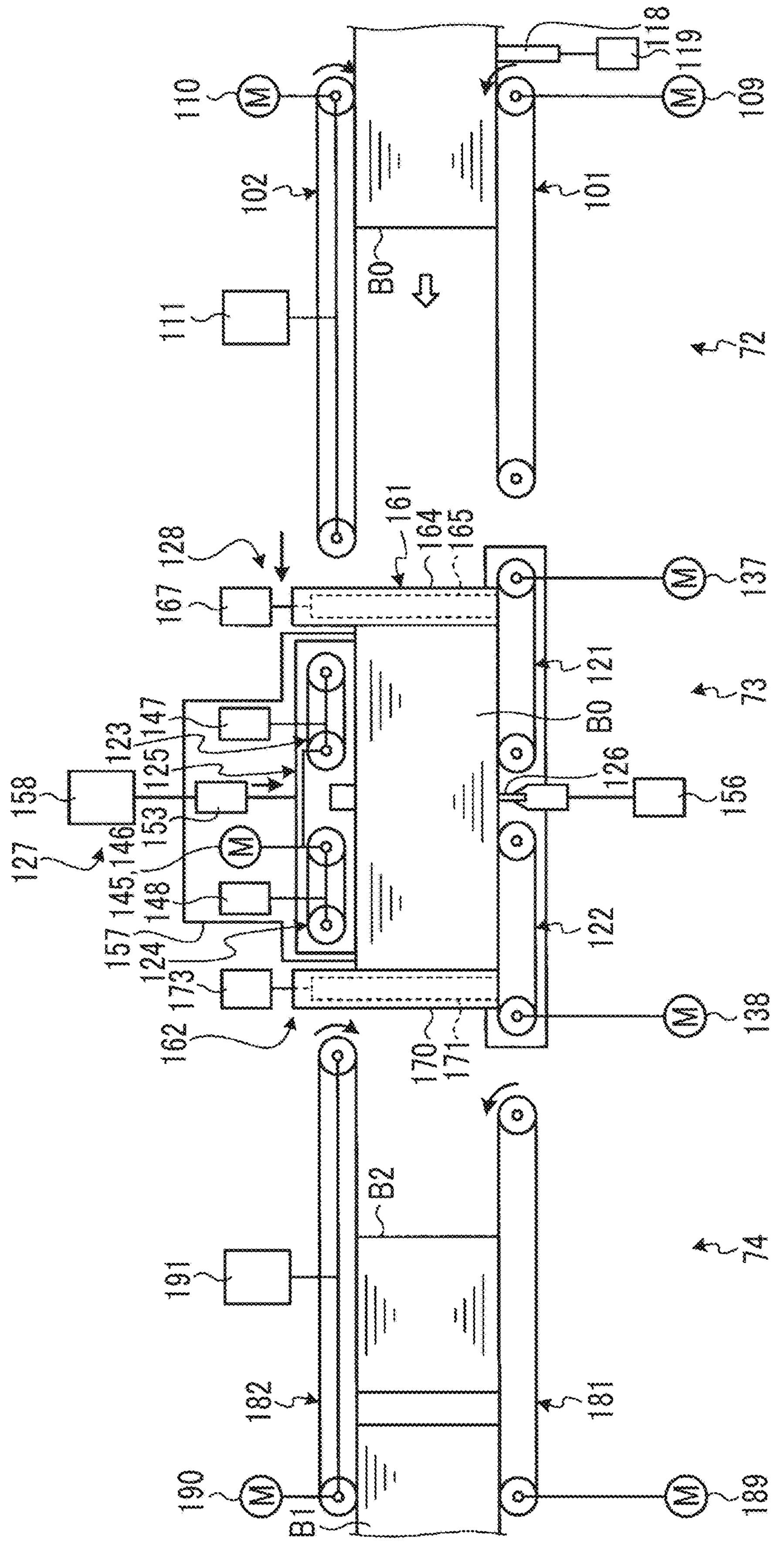
FIG. 14 is a schematic diagram illustrating the state of pressing by a pressing device.
Figure 15:
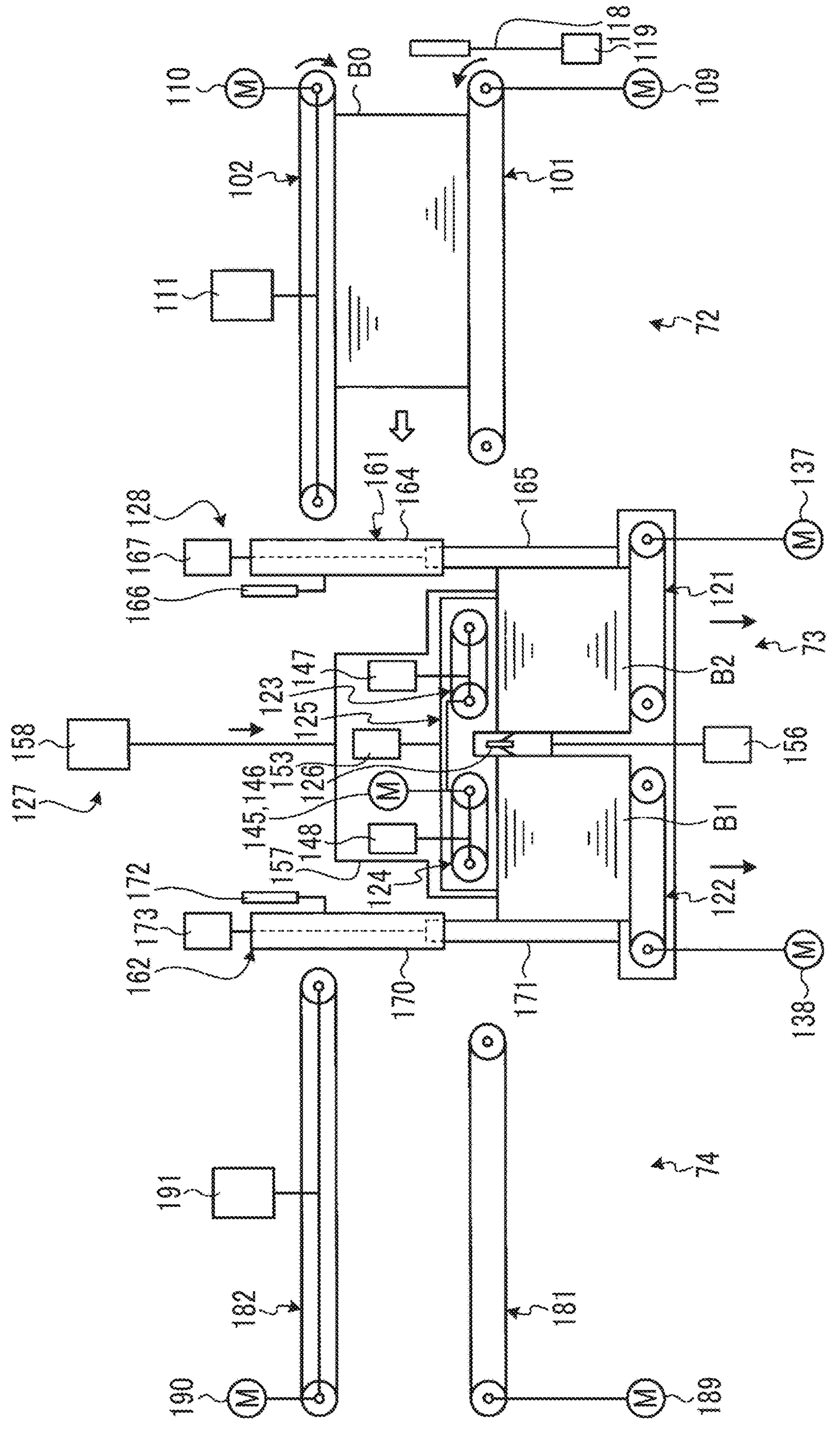
FIG. 15 is a schematic diagram illustrating the state of cutting by the lowering operation of the connected cardboard box body.
Figure 16:
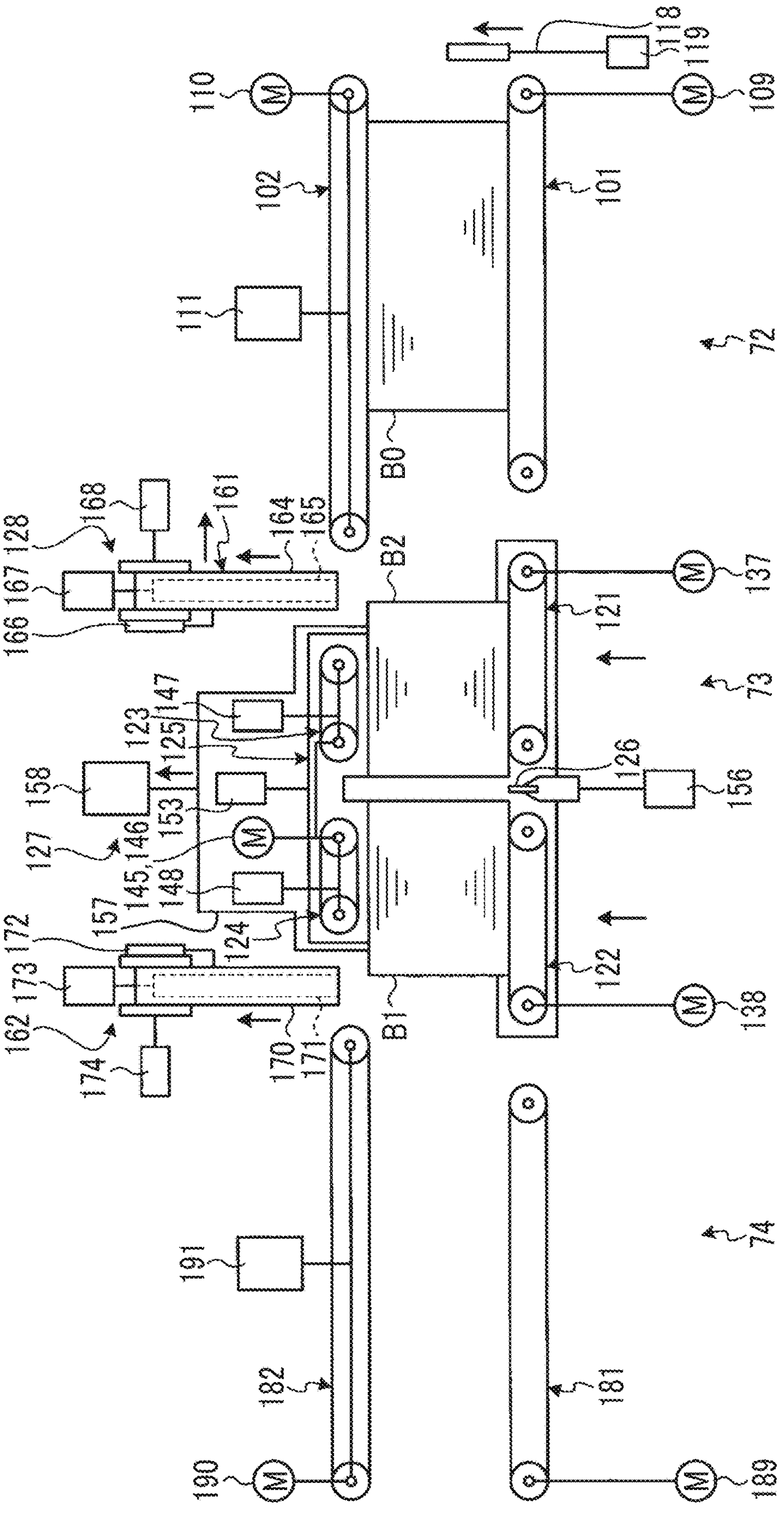
FIG. 16 is a schematic diagram illustrating the lifting state of a cardboard box.
Figure 17:
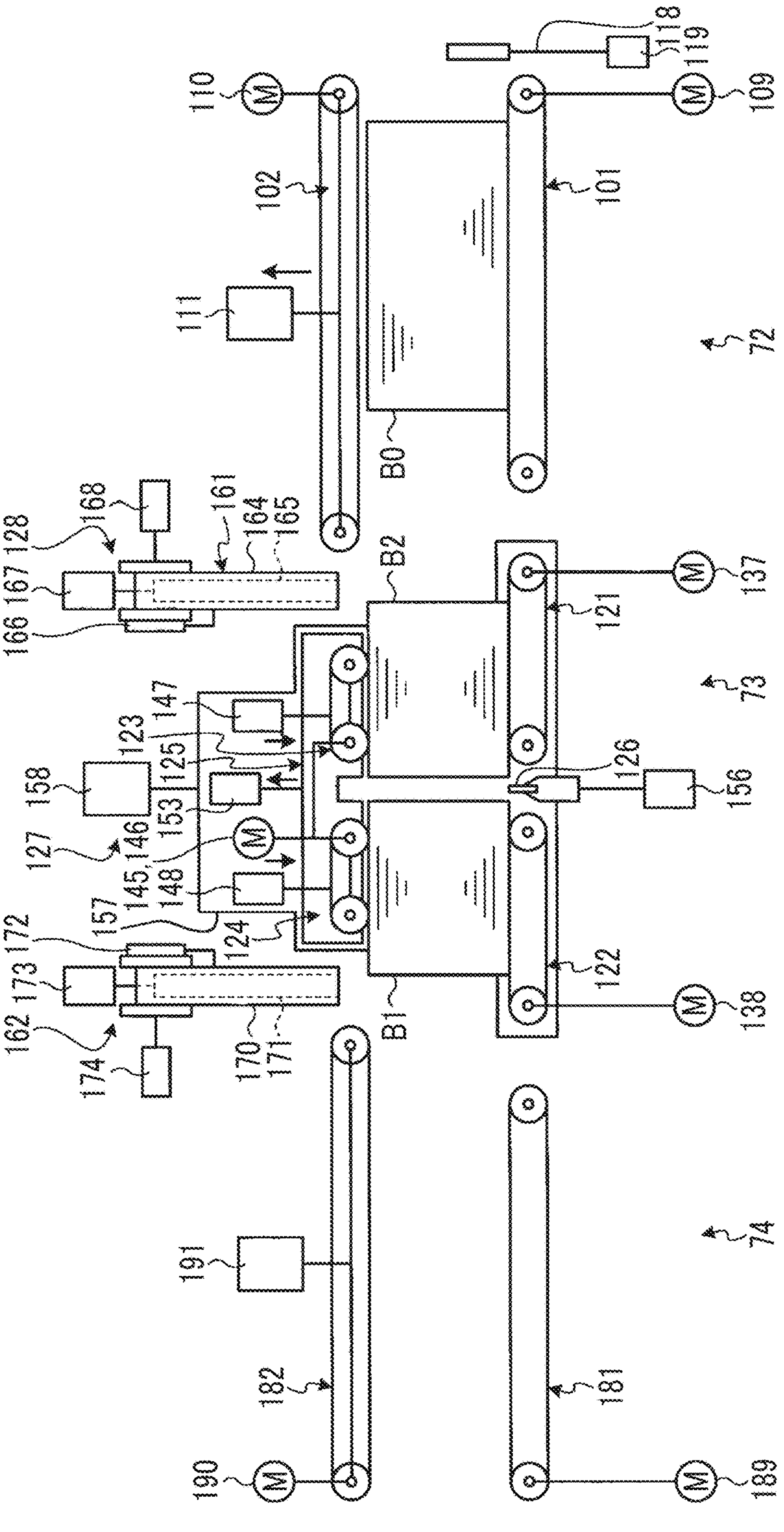
FIG. 17 is a schematic diagram illustrating the support state of the upper conveyor.
Figure 18:
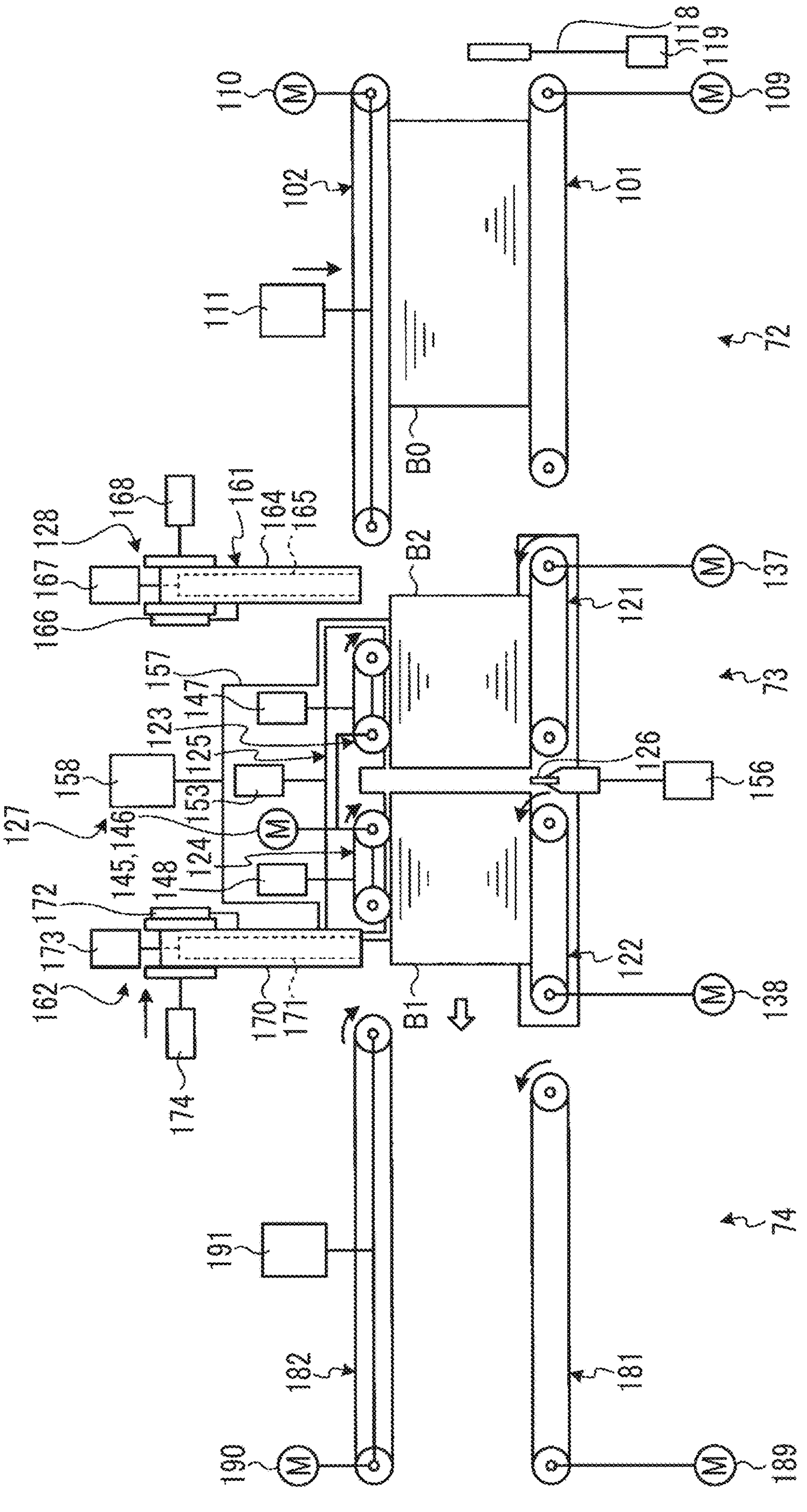
FIG. 18 is a schematic diagram illustrating the movement state of a downstream side positioning member.
Figure 19:
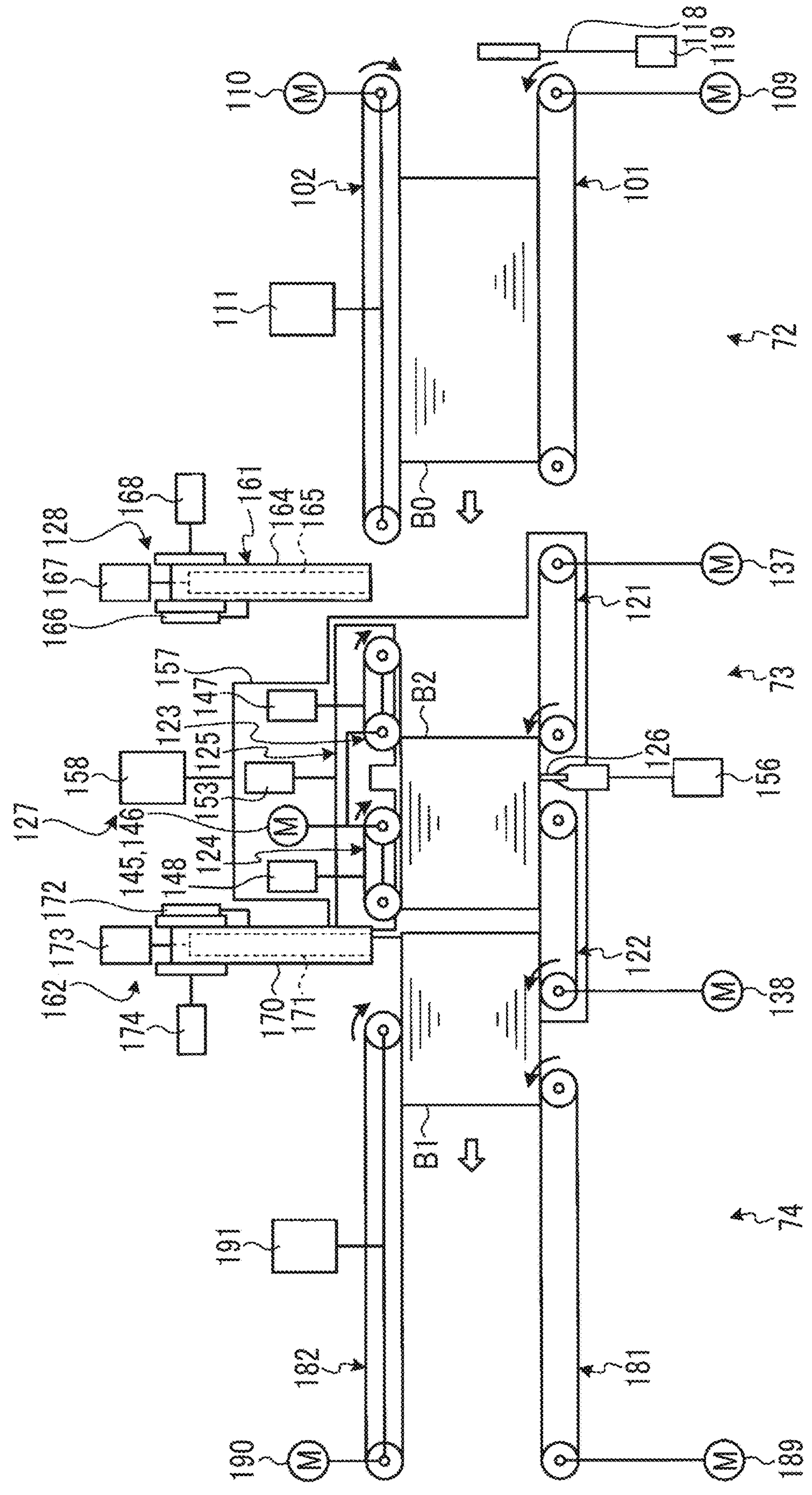
FIG. 19 is a schematic diagram illustrating the unloading state of the cardboard box.
Figure 20:
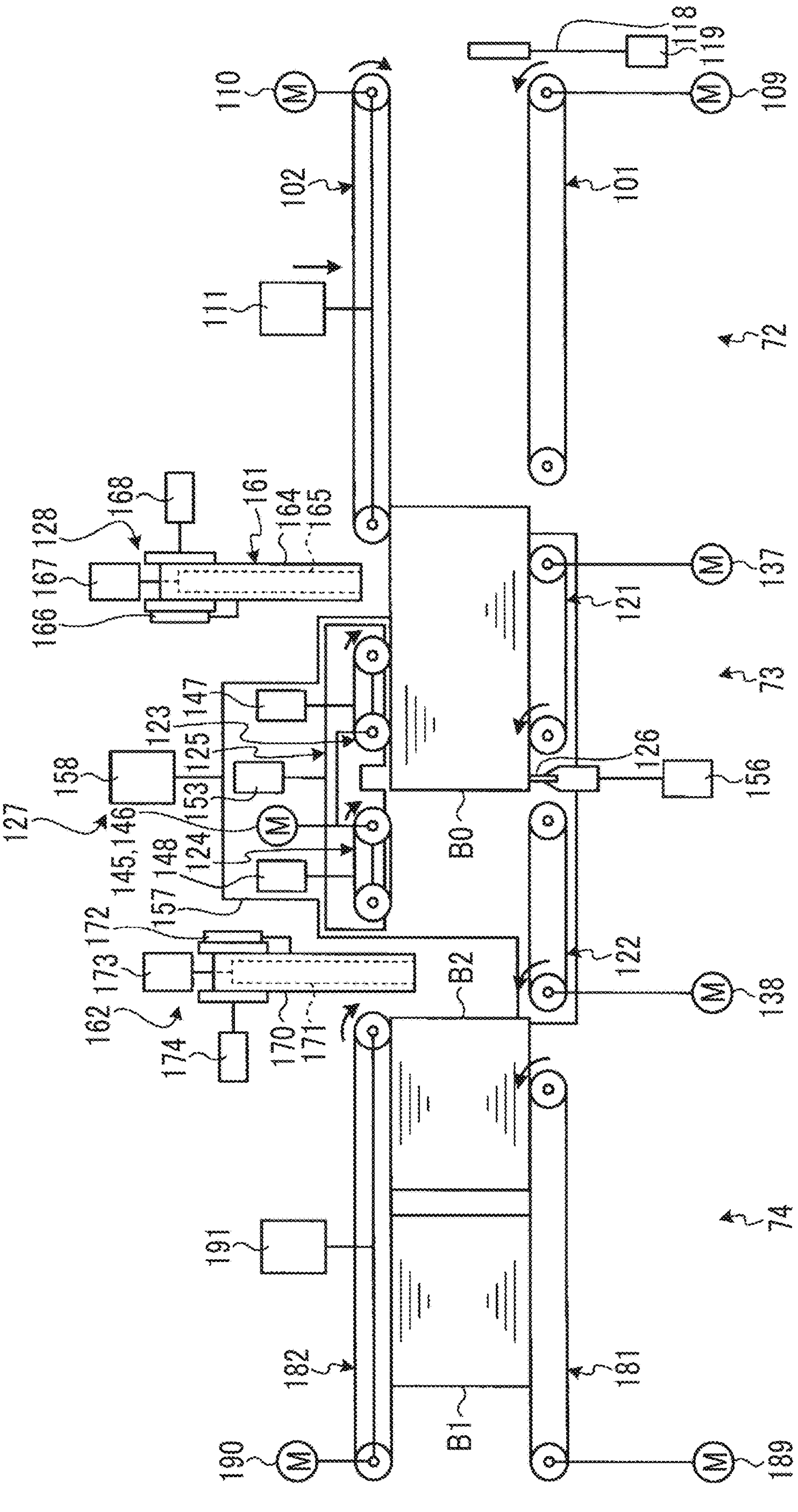
FIG. 20 is a schematic diagram illustrating the unloading state of the cardboard box and the loading state of the connected cardboard box body.

Next, the operation of the dividing device 71 in the cardboard box production device 10 of the present embodiment will be described in detail. FIG. 10 is a time chart illustrating operation in the cardboard box dividing device, FIG. 11 is a schematic diagram illustrating the loading state of the connected cardboard box body, FIG. 12 is a schematic diagram illustrating the retreat state of the upper conveyor, FIG. 13 is a schematic diagram illustrating the state of positioning by the positioning member, FIG. 14 is a schematic diagram illustrating the state of pressing by the pressing device, FIG. 15 is a schematic diagram illustrating the state of cutting by the lowering operation of the connected cardboard box body, FIG. 16 is a schematic diagram illustrating the lifting state of the cardboard box, FIG. 17 is a schematic diagram illustrating the support state of the upper conveyor, FIG. 18 is a schematic diagram illustrating the movement state of the downstream side positioning member, FIG. 19 is a schematic diagram illustrating the unloading state of the cardboard box, and FIG. 20 is a schematic diagram illustrating the unloading state of the cardboard box and the loading state of the connected cardboard box body.

As illustrated in FIGS. 2 and 10, the cut cardboard boxes B1 and B2 are unloaded until time t5. When this unloading is completed, the unloading lower conveyor 181 and the unloading upper conveyor 182 in the unloading device 74 stop the drive rotation of the respective drive motors 189 and 190 at time t5 and completely stop at time t6. The arrival detection sensor 232 is turned OFF from time t2 to t3, and the passage detection sensor 233 is turned OFF from time t3 to t4.

At time t1, the loading lower conveyor 101 and the loading upper conveyor 102 in the loading device 72 start operating by the drive rotation of the respective drive motors 109 and 110. In addition, the inlet side lower conveyor 121, the outlet side lower conveyor 122, the inlet side upper conveyor 123, and the outlet side upper conveyor 124 in the cutting device 73 are in operation by the drive rotation of the respective drive motors 137, 138, 145, and 146. Accordingly, the connected cardboard box body B0 is loaded by the loading device 72 and supplied to the cutting device 73. In addition, the first drive device 172 is driven and lowering is performed with the inner cylinder 171 held in the outer cylinder 170 of the downstream side positioning member 162 from time t4 to t5, and the third drive device 174 is driven, the downstream side positioning member 162 moves to the downstream side in the transport direction Da, and the downstream side positioning member 162 stops at a paper alignment position from time t4 to t6.

Figure 11:
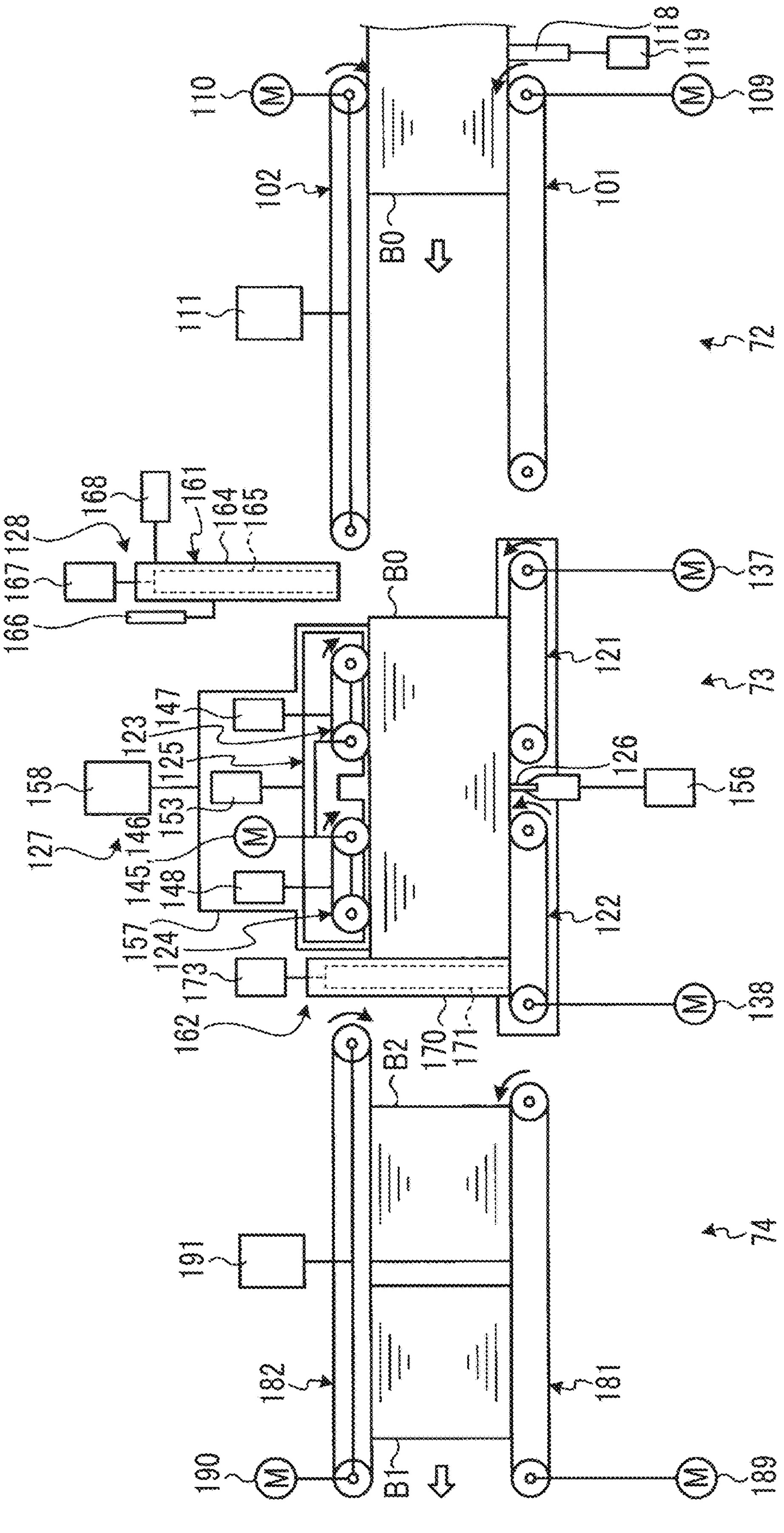
FIG. 11 is a schematic diagram illustrating the loading state of a connected cardboard box body.

As illustrated in FIGS. 10 and 11, when the connected cardboard box body B0 is supplied to a predetermined cutting position in the cutting device 73, the arrival detection sensor 232 detects the leading edge of the connected cardboard box body B0 and is turned ON from time t6 to t7. Then, the loading lower conveyor 101 and the loading upper conveyor 102 in the loading device 72 stop operating from time t7 to t8. In addition, the inlet side lower conveyor 121, the outlet side lower conveyor 122, the inlet side upper conveyor 123, and the outlet side upper conveyor 124 in the cutting device 73 stop operating from time t8 to t9.

As illustrated in FIGS. 10 and 12, when the connected cardboard box body B0 stops at a predetermined cutting position in the cutting device 73, the inlet side upper conveyor 123 and the outlet side upper conveyor 124 ascend from time t10 to t11 and the support of the upper portion of the connected cardboard box body B0 is released. In addition, the upstream side positioning member 161 descends from time t10 to t11 with the inner cylinder 165 held in the outer cylinder 164. Here, as illustrated in FIGS. 10 and 13, the left side portion alignment device 175 and the right side portion alignment device 176 operate (paper alignment execution) from time t11 to t12 and perform paper alignment in the width direction Db on the plurality of connected cardboard box bodies B0 stacked on the inlet side lower conveyor 121 and the outlet side lower conveyor 122. In addition, the outer cylinder 164 moves to the downstream side in the transport direction Da from time t13 to t14 and the upstream side positioning member 161 performs paper alignment in the transport direction Da on the plurality of connected cardboard box bodies B0 stacked on the inlet side lower conveyor 121 and the outlet side lower conveyor 122 together with the outer cylinder 170 of the downstream side positioning member 162.

Then, as illustrated in FIGS. 10 and 14, the upstream side positioning member 161 and the downstream side positioning member 162 exert a descending-direction stress on each of the inner cylinders 165 and 171 from time t16 to t17. The pressing device 125 performs pressing support on the plurality of connected cardboard box bodies B0 stacked on the inlet side lower conveyor 121 and the outlet side lower conveyor 122 by lowering the width direction pressing members 149 and 150 and the transport direction pressing members 151 and 152 from time t15 to t16.

The plurality of connected cardboard box bodies B0 are lowered by the lifting/lowering device 127 operating from time t16 to t17 as illustrated in FIGS. 10 and 15 when the plurality of connected cardboard box bodies B0 stacked on the inlet side lower conveyor 121 and the outlet side lower conveyor 122 are supported by the left side portion alignment device 175, the right side portion alignment device 176, the upstream side positioning member 161, the downstream side positioning member 162, the width direction pressing members 149 and 150, and the transport direction pressing members 151 and 152. Then, as a result of the lowering operation of the plurality of connected cardboard box bodies B0, the cutting knife 126 relatively ascends, cuts the plurality of connected cardboard box bodies B0 along the width direction Db, and turns the plurality of connected cardboard box bodies B0 into the plurality of cardboard boxes B1 and B2. When the plurality of connected cardboard box bodies B0 descend, the respective inner cylinders 165 and 171 of the upstream side positioning member 161 and the downstream side positioning member 162, which are respectively narrower in width than the outer cylinders 164 and 170, descend, and thus a gap is ensured between the plurality of connected cardboard box bodies B0. When the plurality of connected cardboard box bodies B0 are cut by the cutting knife 126, the plurality of cardboard boxes B1 are slightly movable in the range of the gap toward the downstream side in the transport direction Da and the plurality of cardboard boxes B2 are slightly movable in the range of the gap toward the upstream side in the transport direction Da.

When the plurality of connected cardboard box bodies B0 are cut into the plurality of cardboard boxes B1 and B2, the lifting/lowering device 127 operates from time t17 to t20 and the plurality of cardboard boxes B1 and B2 are lifted as illustrated in FIGS. 10 and 16. At this time, the left side portion alignment device 175 and the right side portion alignment device 176 operate (paper alignment release) from time t17 to t18 and move to the standby position separated from the cardboard boxes B1 and B2. In addition, the upstream side positioning member 161 and the downstream side positioning member 162 ascend from time t17 to t20. The upstream side positioning member 161 moves to the upstream side in the transport direction Da from time t17 to t21.

In addition, when the plurality of cardboard boxes B1 and B2 ascend, the pressing device 125 lifts the width direction pressing members 149 and 150 and the transport direction pressing members 151 and 152 from time t18 to t21 as illustrated in FIGS. 10 and 17, and the pressing support of the plurality of cardboard boxes B1 and B2 stacked on the inlet side lower conveyor 121 and the outlet side lower conveyor 122 is released as a result. Meanwhile, the inlet side upper conveyor 123 and the outlet side upper conveyor 124 descend from time t18 to t19 and support the upper portions of the cardboard boxes B1 and B2. In addition, as illustrated in FIGS. 10 and 18, the unloading lower conveyor 181 and the unloading upper conveyor 182 in the unloading device 74, the inlet side lower conveyor 121, the outlet side lower conveyor 122, the inlet side upper conveyor 123, and the outlet side upper conveyor 124 start operating at time t21. The downstream side positioning member 162 moves to the standby position on the upstream side in the transport direction Da from time t22 to t23. The passage detection sensor 233 detects the leading edge of the cardboard box B1 with unloading started and is turned ON from time t21 to t22.

Then, the plurality of cardboard boxes B1 and B2 are transferred from the cutting device 73 to the unloading device 74 as illustrated in FIGS. 10 and 19, and the plurality of cardboard boxes B1 and B2 are unloaded by the unloading device 74 as illustrated in FIGS. 10 and 20. Subsequently, the downstream side positioning member 162 descends.

As described above, the cardboard box dividing device of the present embodiment includes the lower conveyors 121 and 122 on which the plurality of connected cardboard box bodies B0 are stacked and transported, the pressing device 125 pressing the plurality of connected cardboard box bodies B0 stacked on the lower conveyors 121 and 122 from above, the cutting knife 126 disposed along the width direction Db of the connected cardboard box body B0 and dividing the plurality of connected cardboard box bodies B0 stacked on the lower conveyors 121 and 122 into the front and rear parts, and the lifting/lowering device 127 lifting and lowering the lower conveyors 121 and 122 and the pressing device 125.

Accordingly, the plurality of stacked connected cardboard box bodies B0 are mounted onto the lower conveyors 121 and 122, are pressed from above by the pressing device 125 at a predetermined cutting position stopped on the lower conveyors 121 and 122, and are cut and divided by the cutting knife 126 by the lifting/lowering device 127 lifting and lowering the plurality of connected cardboard box bodies B0 in that state. Although the connected cardboard box body B0 is unstable in a state where the plurality of connected cardboard box bodies B0 are stacked, the plurality of connected cardboard box bodies B0 on the lower conveyors 121 and 122 are cut in a state of being pressed by the pressing device 125, and thus the plurality of connected cardboard box bodies B0 can be stably cut. At this time, the lower conveyors 121 and 122 and the pressing device 125 are integrally lifted and lowered by the lifting/lowering device 127, and thus lifting/lowering speed control and pressing control on the cardboard box B can be separately performed. As a result, it is possible to stably cut the connected cardboard box body B0 and achieve structural simplification by independently performing the lifting/lowering speed control and the pressing control during the cutting of the connected cardboard box body B0.

In the cardboard box dividing device of the present embodiment, the lifting/lowering base 157 supporting the lower conveyors 121 and 122 and the pressing device 125 and the lifting/lowering drive device 158 lifting and lowering the lifting/lowering base 157 are provided as the lifting/lowering device 127, and the pressing members 149, 150, 151, and 152 supported by the lifting/lowering base 157 so as to be movable along the up-down direction and the pressing drive device 153 moving the pressing members 149, 150, 151, and 152 are provided as the pressing device 125. Accordingly, the lifting/lowering base 157 is lifted and lowered by the lifting/lowering drive device 158 with the lifting/lowering base 157 supporting the lower conveyors 121 and 122 and the pressing device 125 and the pressing drive device 153 supports the pressing members 149, 150, 151, and 152 so as to be movable along the up-down direction, and thus it is possible to independently move the lower conveyors 121 and 122 and the pressing members 149, 150, 151, and 152 up and down with respect to the lifting/lowering base 157, independently perform the pressing operation of the connected cardboard box body B0 by the pressing members 149, 150, 151, and 152 and the lifting/lowering operation of the lower conveyors 121 and 122 by the lifting/lowering drive device 158, and stably cut the plurality of connected cardboard box bodies B0 with a simple configuration.

In the cardboard box dividing device of the present embodiment, the upper conveyors 123 and 124 face the lower conveyors 121 and 122 from above, the upper conveyors 123 and 124 support the upper portions of the plurality of connected cardboard box bodies B0 that are stacked, and the upper conveyors 123 and 124 are disposed on the lifting/lowering base 157 so as to be movable along the up-down direction. Accordingly, the connected cardboard box body B0 is transported in a state of being sandwiched by the lower conveyors 121 and 122 and the upper conveyors 123 and 124, and thus the plurality of connected cardboard box bodies B0 can be stably transported, an increase in transport speed can be achieved, and production efficiency can be improved.

The rigidity of the cardboard sheet S varies with the type, shape, and size of the paper and, for example, the cardboard sheet S that is large in size has high stability because of its large weight and the cardboard sheet S that is small in size has low stability because of its small weight. In the cardboard box dividing device of the present embodiment, the connected cardboard box body B0 is sandwiched by the lower conveyors 121 and 122 and the upper conveyors 123 and 124 and transported, and thus the connected cardboard box body B0 can be stably transported regardless of its size. In this case, the transport distance (transport time) for the small cardboard sheet S to reach the cutting position of the cutting device 73 is short, and thus a decline in production efficiency does not arise even when the transport speed (transport time) is reduced. Accordingly, it is desirable that stable transport is ensured for the small connected cardboard box body B0 by means of a transport speed lower than the transport speed of the large connected cardboard box body B0.

In the cardboard box dividing device of the present embodiment, the upper conveyors 123 and 124 are disposed in the pressing members 149, 150, 151, and 152, specifically, in the attachment frames 211 and 212 supporting the pressing members 149, 150, 151, and 152. Accordingly, the upper conveyors 123 and 124 and the pressing members 149, 150, 151, and 152 can be made compact.

In the cardboard box dividing device of the present embodiment, the attachment frames 211 and 212 of the pressing device 125 are fixed to the lifting/lowering base 157, the plurality of pressing members 149, 150, 151, and 152 are fixed to the lower portions of the attachment frames 211 and 212, the space sections 213 and 214 opening downward are provided between the plurality of pressing members 149, 150, 151, and 152, and the upper conveyors 123 and 124 are disposed in the space sections 213 and 214 so as to be movable along the up-down direction. Accordingly, the plurality of pressing members 149, 150, 151, and 152 are fixed to the attachment frames 211 and 212 of the pressing device 125 and the upper conveyors 123 and 124 are disposed in the space sections 213 and 214 provided between the plurality of pressing members 149, 150, 151, and 152, and thus the pressing members 149, 150, 151, and 152 and the upper conveyors 123 and 124 are disposed side by side in the horizontal direction, no mutual interference arises when the upper conveyors 123 and 124 and the pressing members 149, 150, 151, and 152 move up and down, and the upper conveyors 123 and 124 and the pressing members 149, 150, 151, and 152 can be made compact.

In addition, the cardboard box production device of the present embodiment includes the sheet feeding section 11 supplying the double box sheet S0, the slotter creaser section 31 performing creasing line processing on the surface of the double box sheet S0 and performing grooving, the folding section 51 forming the connected cardboard box body B0 by folding the double box sheet S0 and bonding the end portions, the counter-ejector section 61 discharging a predetermined number of the connected cardboard box bodies B0 at a time after stacking the connected cardboard box bodies B0 while counting the connected cardboard box bodies B0, and the dividing device 71 for cutting and dividing the connected cardboard box body B0 along the width direction Db intersecting with the transport direction Da.

Accordingly, the creasing line processing and the grooving are performed on the double box sheet S0 from the sheet feeding section 11 by the slotter creaser section 31, the connected cardboard box body B0 is formed by the double box sheet S0 being folded by the folding section 51 and the end portions being bonded, the box bodies are stacked while being counted by the counter-ejector section 61, the connected cardboard box body B0 is cut by the dividing device 71, and the cardboard boxes B1 and B2 are produced as a result. During the cutting by the dividing device 71, the connected cardboard box body B0 on the lower conveyors 121 and 122 is cut in a state of being pressed by the pressing device 125, and thus the plurality of connected cardboard box bodies B0 can be stably cut. At this time, the lower conveyors 121 and 122 and the pressing device 125 are integrally lifted and lowered by the lifting/lowering device 127, and thus lifting/lowering speed control and pressing control on the cardboard box B can be separately performed. As a result, it is possible to stably cut the connected cardboard box body B0 and achieve structural simplification by independently performing the lifting/lowering speed control and the pressing control during the cutting of the connected cardboard box body B0.

It should be noted that the present invention is not limited to the above-described embodiment in which the carton-forming machine 10A produces the connected cardboard box body B0 by processing the double box sheet S0 and the dividing device 71 produces the cardboard boxes B1 and B2 by cutting the connected cardboard box body B0. For example, a carton-forming machine may produce a connected cardboard box body by processing a triple box sheet and a dividing device may produce a cardboard box by cutting the connected cardboard box body into three pieces. In this case, the produced cardboard boxes may have the same size or different sizes. In other words, it is possible to produce the connected cardboard box bodies B0 that are different in size by shifting the stop position (cutting position) of the connected cardboard box body B0 in the cutting device 73 in the transport direction Da.

In addition, the connected cardboard box body B0 may be cut by being lifted with respect to the cutting knife 126 although the connected cardboard box body B0 in the embodiment described above is cut by being lowered with respect to the cutting knife 126.

In addition, although the inlet side lower conveyor 121 and the outlet side lower conveyor 122 are provided as the lower conveyors and the inlet side upper conveyor 123 and the outlet side upper conveyor 124 are provided as the upper conveyors in the embodiment described above, the back-and-forth division may be replaced with integrated provision. In addition, an electric motor, a hydraulic motor, a hydraulic cylinder, an air cylinder, and so on may be used as the various drive devices.

In addition, the present invention is not limited to the configuration of the above-described embodiment in which the sheet feeding section 11, the printing section 21, the slotter creaser section 31, the die cutting section 41, the folding section 51, and the counter-ejector section 61 constitute the carton-forming machine 10A. For example, the printing section 21 may be omitted in a case where the cardboard sheet S or the connected cardboard box body B0 requires no printing. In addition, the die cutting section 41 may be omitted in a case where, for example, the cardboard sheet S or the connected cardboard box body B0 does not require punching of a hand hole or the like.

REFERENCE SIGNS LIST

10: Cardboard box production device
10A: Carton-forming machine
11: Sheet feeding section
21: Printing section
31: Slotter creaser section
41: Die cutting section
51: Folding section
61: Counter-ejector section
71: Cardboard box dividing device (dividing device)
72: Loading device
73: Cutting device
74: Unloading device
81: Transport conveyor
101: Loading lower conveyor
102: Loading upper conveyor
109, 110: Drive motor
111: Loading upper conveyor moving device
112: Left side portion alignment device
113: Right side portion alignment device
118: Opening-closing door
119: Drive cylinder
121: Inlet side lower conveyor (lower conveyor)
122: Outlet side lower conveyor (lower conveyor)
123: Inlet side upper conveyor (upper conveyor)
124: Outlet side upper conveyor (upper conveyor)
125: Pressing device
126: Cutting knife
127: Lifting/lowering device
128: Positioning device
137, 138, 145, 146: Drive motor
147: Inlet side upper conveyor moving device
148: Outlet side upper conveyor moving device
149, 150: Width direction pressing member
151, 152: Transport direction pressing member
153: Pressing drive device
156: Cutting knife drive device
157: Lifting/lowering base
158: Lifting/lowering drive device
161: Upstream side positioning member
162: Downstream side positioning member
163, 169: Supporting cylinder
164, 170: Outer cylinder
165, 171: Inner cylinder
166, 172: First drive device (positioning drive device)
167, 173: Second drive device (positioning drive device)
168, 174: Third drive device (positioning drive device)
175: Left side portion alignment device
176: Right side portion alignment device
181: Unloading lower conveyor
182: Unloading upper conveyor
189, 190: Drive motor
191: Unloading upper conveyor moving device
231: Control device
232: Arrival detection sensor
233: Passage detection sensor
S: Cardboard sheet
S1, S2: Single box sheet
S0: Double box sheet
B, B1, B2: Cardboard box
B0: Connected cardboard box body

The invention claimed is:

1. A cardboard box dividing device for cutting and dividing, along a width direction intersecting with a transport direction, a connected cardboard box laminate in which a plurality of connected cardboard box bodies continuous along the transport direction are stacked in a thickness direction, the cardboard box dividing device comprising:

- a lower conveyor on which the plurality of connected cardboard box bodies are stacked and transported;
- a press pressing, from above, the plurality of connected cardboard box bodies stacked on the lower conveyor;
- a cutting knife disposed along the width direction and dividing the plurality of connected cardboard box bodies stacked on the lower conveyor into a front part and a rear part; and
- a lift lifting and lowering the lower conveyor and the press, wherein the lift has
  - a lifting and lowering base connected to the lower conveyor and the press, and
  - a lifting and lowering driver connected to a device frame for lifting and lowering the lifting and lowering base, the press has
  - a sub-press supported by the lifting and lowering base so as to be movable along an up-down direction, and a pressing driver connected to the press for moving the sub-press, the lifting and lowering base is connected to connecting members, and the connecting members are connected to the lower conveyor, the pressing driver connects the lifting and lowering base to the press, the lifting and lowering driver lifts and lowers the lifting and lowering base to lift and lower the lower conveyor connected to the connecting members and the press connected to the lifting and lowering base by the pressing driver, the lifting and lowering driver expands during cutting of the plurality of connected cardboard box bodies and contracts after finishing cutting of the plurality of connected cardboard box bodies, and the pressing driver supports the plurality of connected cardboard box bodies by the press during cutting of the plurality of connected cardboard box bodies.

2. The cardboard box dividing device according to claim 1, wherein an upper conveyor facing the lower conveyor from above and supporting upper portions of the plurality of stacked connected cardboard box bodies is disposed on the lifting and lowering base so as to be movable along the up-down direction.

3. The cardboard box dividing device according to claim 2, wherein the upper conveyor is disposed in the sub-press.

4. The cardboard box dividing device according to claim 3, wherein an attachment frame of the press is fixed to the lifting and lowering base, a plurality of the sub-press are fixed to a lower portion of the attachment frame, a space section opening downward is provided between the plurality of sub-press, and the upper conveyor is disposed in the space section so as to be movable along the up-down direction.

5. A cardboard box production device comprising:

a sheet feeder supplying a double box sheet;

a slotter creaser performing creasing line processing on a surface of the double box sheet and performing grooving;

a folder forming a connected cardboard box body by folding the double box sheet and bonding end portions;

a counter-ejector discharging a predetermined number of the connected cardboard box bodies at a time after stacking the connected cardboard box bodies while counting the connected cardboard box bodies; and the cardboard box dividing device according to claim 1 for cutting and dividing the connected cardboard box body along the width direction intersecting with the transport direction.

6. The cardboard box dividing device according to claim 1, wherein the lifting and lowering base is provided above the press with respect to a vertical direction.

7. A cardboard box dividing device for cutting and dividing, along a width direction intersecting with a transport direction, a connected cardboard box laminate in which a plurality of connected cardboard box bodies continuous along the transport direction are stacked in a thickness direction, the cardboard box dividing device comprising:

a lower conveyor on which the plurality of connected cardboard box bodies are stacked and transported;

a press pressing, from above, the plurality of connected cardboard box bodies stacked on the lower conveyor;

a cutting knife disposed along the width direction and dividing the plurality of connected cardboard box bodies stacked on the lower conveyor into a front part and a rear part; and a lift lifting and lowering the lower conveyor and the press, wherein the lift has a lifting and lowering base connected to the lower conveyor and the press, a lifting and lowering driver connected to a device frame for lifting and lowering the lifting and lowering base, and a first expanding and contracting device extending from the lifting and lowering driver and having a leading edge portion connected to the lifting and lowering base, (i) expanding during cutting of the plurality of connected cardboard box bodies, and (ii) contracting after finishing cutting of the plurality of connected cardboard box bodies, the press has a sub-press supported by the lifting and lowering base so as to be movable along an up-down direction, a pressing driver connected to the press for moving the sub-press, and a second expanding and contracting device extending from the lifting and lowering base, having a leading edge portion connected to the press, and supporting the plurality of connected cardboard box bodies by the press during cutting of the plurality of connected cardboard box bodies, the lifting and lowering base is connected to connecting members, and the connecting members are connected to the lower conveyor, the pressing driver connects the lifting and lowering base to the press, and the lifting and lowering driver lifts and lowers the lifting and lowering base to lift and lower integrally the lower conveyor connected to the connecting members and the press connected to the lifting and lowering base by the pressing driver.

8. The cardboard box dividing device according to claim 7, wherein the lifting and lowering base is provided above the press with respect to a vertical direction.

9. A cardboard box dividing device for cutting and dividing, along a width direction intersecting with a transport direction, a connected cardboard box laminate in which a plurality of connected cardboard box bodies continuous along the transport direction are stacked in a thickness direction, the cardboard box dividing device comprising:

a lower conveyor on which the plurality of connected cardboard box bodies are stacked and transported;

a press pressing, from above, the plurality of connected cardboard box bodies stacked on the lower conveyor;

a cutting knife disposed along the width direction and dividing the plurality of connected cardboard box bodies stacked on the lower conveyor into a front part and a rear part; and a lift lifting and lowering the lower conveyor and the press, wherein the lift has a lifting and lowering base connected to the lower conveyor and the press, a lifting and lowering driver connected to a device frame for lifting and lowering the lifting and lowering base, and a first drive rod extending from the lifting and lowering driver and having a leading edge portion connected to the lifting and lowering base, (i) expanding during cutting of the plurality of connected cardboard box bodies, and (ii) contracting after finishing cutting of the plurality of connected cardboard box bodies, the press has a sub-press supported by the lifting and lowering base so as to be movable along an up-down direction, a pressing driver connected to the press for moving the sub-press, and a second drive rod extending from the lifting and lowering base, having a leading edge portion connected to the press, and supporting the plurality of connected cardboard box bodies by the press during cutting of the plurality of connected cardboard box bodies, the lifting and lowering base is connected to connecting members, and the connecting members are connected to the lower conveyor, the pressing driver connects the lifting and lowering base to the press, and the lifting and lowering driver lifts and lowers the lifting and lowering base to lift and lower integrally the lower conveyor connected to the connecting members and the press connected to the lifting and lowering base by the pressing driver.

10. The cardboard box dividing device according to claim 9, wherein the lifting and lowering base is provided above the press with respect to a vertical direction.

* * * * *